(12) United States Patent
Li

(10) Patent No.: US 12,017,374 B2
(45) Date of Patent: Jun. 25, 2024

(54) BLADE-REPLACEABLE CUTTING TOOL

(71) Applicants: HANGZHOU GREAT STAR INDUSTRIAL CO., LTD., Hangzhou (CN); HANGZHOU GREAT STAR TOOLS CO., LTD., Hangzhou (CN)

(72) Inventor: Yueming Li, Hangzhou (CN)

(73) Assignees: HANGZHOU GREAT STAR INDUSTRIAL CO., LTD., Hangzhou (CN); HANGZHOU GREAT STAR TOOLS CO., LTD., Hangzhou (CN)

(*) Notice: Subject to any disclaimer, the term of this patent is extended or adjusted under 35 U.S.C. 154(b) by 0 days.

(21) Appl. No.: 17/358,942

(22) Filed: Jun. 25, 2021

(65) Prior Publication Data

US 2021/0323177 A1 Oct. 21, 2021

Related U.S. Application Data

(62) Division of application No. 16/344,916, filed as application No. PCT/CN2017/096468 on Aug. 8, 2017, now Pat. No. 11,045,962.

(30) Foreign Application Priority Data

Dec. 27, 2016 (CN) .......................... 201621447525.0

(51) Int. Cl.
*B26B 5/00* (2006.01)
*B23D 21/10* (2006.01)
(Continued)

(52) U.S. Cl.
CPC ................ *B26B 5/00* (2013.01); *B23D 21/10* (2013.01); *B25B 7/12* (2013.01); *B25B 7/14* (2013.01);
(Continued)

(58) Field of Classification Search
CPC ........... B26B 5/00; B26B 13/26; B23D 21/06; B23D 21/10; B25B 7/14; B26D 3/16; B26D 3/166; B26D 3/169
(Continued)

(56) References Cited

U.S. PATENT DOCUMENTS 4,186,484 A * 2/1980 Tanaka ................ B23D 29/023
30/92
4,674,184 A 6/1987 Anderson
(Continued)

FOREIGN PATENT DOCUMENTS

CN 201020671 Y 2/2008
CN 201033435 Y 3/2008
(Continued)

OTHER PUBLICATIONS

App. No. PCT/CN2017/096468; International Search Report dated Nov. 13, 2017.

*Primary Examiner* — Nhat Chieu Q Do
(74) *Attorney, Agent, or Firm* — Fitch, Even, Tabin & Flannery, LLP

(57) ABSTRACT

The present invention provides a blade-replaceable cutting tool, which includes: a first handheld portion and a second handheld portion; the second handheld portion is rotatably connected to the first handheld portion; and further includes a blade mounting plate and a blade, the blade mounting plate is rotatably mounted to the first handheld portion; the blade is detachably mounted to the blade mounting plate. Wherein, the blade mounting plate and the blade may be replaced with a ratchet blade which is detachably and rotatably mounted to the first handheld portion.

5 Claims, 17 Drawing Sheets

(51) Int. Cl.
    *B25B 7/12*     (2006.01)
    *B25B 7/14*     (2006.01)
    *B26D 3/16*     (2006.01)
    *B23D 21/06*     (2006.01)

(52) U.S. Cl.
    CPC ........... *B26D 3/16* (2013.01); *B23D 21/06* (2013.01); *B26D 3/169* (2013.01)

(58) Field of Classification Search
    USPC ............................. 30/92, 250, 260, 353–357
    See application file for complete search history.

(56) References Cited

U.S. PATENT DOCUMENTS

| | | |
|---|---|---|
| 5,718,051 A | 2/1998 | Huang |
| 6,305,087 B1 | 10/2001 | Huang |
| 6,658,738 B1 * | 12/2003 | King ............... B26D 3/169 30/92 |
| 7,127,819 B1 | 10/2006 | Huang |
| 7,743,509 B2 | 6/2010 | Macsay |
| 8,024,864 B2 * | 9/2011 | Mortensen ........... B26D 5/10 30/92 |
| 9,179,605 B2 | 11/2015 | Yamaoka et al. |
| 9,616,508 B2 | 4/2017 | Han |
| 2004/0134073 A1 | 7/2004 | Kochi |
| 2006/0254057 A1 | 11/2006 | Houseman |
| 2007/0022610 A1 | 2/2007 | Huang |
| 2008/0141538 A1 | 6/2008 | Nandkumar |
| 2008/0307657 A1 * | 12/2008 | Macsay ............... B26D 3/169 30/250 |
| 2009/0223059 A1 * | 9/2009 | Yu Chen ............. B26D 3/169 30/92 |
| 2014/0290067 A1 * | 10/2014 | Ronan ................. B26B 13/26 30/92 |
| 2016/0059327 A1 * | 3/2016 | Han .................... B26D 3/169 30/92 |
| 2018/0326513 A1 * | 11/2018 | Chen ................... B26D 3/169 |
| 2019/0263009 A1 | 8/2019 | Li |

FOREIGN PATENT DOCUMENTS

| | | |
|---|---|---|
| CN | 101605637 A | 12/2009 |
| CN | 101631652 A | 1/2010 |
| CN | 201808081 U | 4/2011 |
| CN | 202781216 U | 3/2013 |
| CN | 203649525 U | 6/2014 |
| CN | 203805006 U | 9/2014 |
| CN | 205129904 U | 4/2016 |
| CN | 207373213 U | 5/2018 |
| JP | 03-038070 A | 2/1991 |
| JP | 0338070 A | 2/1991 |
| JP | 10328928 A | 12/1998 |
| JP | 2002253876 A | 9/2002 |
| TW | M312407 U | 5/2007 |
| WO | 2008154109 A1 | 12/2008 |

\* cited by examiner

BLADE-REPLACEABLE CUTTING TOOL

CROSS-REFERENCE TO RELATED APPLICATIONS

This application is a divisional application of U.S. application Ser. No. 16/344,916, with a 35 U.S.C. 371 date of Apr. 25, 2019, which is a U.S. national phase application of International Application No. PCT/CN2017/096468, filed Aug. 8, 2017, designating the United States, which claims the benefit of Chinese Patent Application No. 201621447525.0, filed on Dec. 27, 2016, which are all incorporated by reference in their entirety herein.

FIELD OF THE INVENTION

The present invention relates to hand tools, and in particular to a blade-replaceable cutting tool.

DESCRIPTION OF THE PRIOR ART

The cutting tool, as a common tool, has the blade which will be chipped or damaged after several times of usage so that the whole tool loses its functions, resulting in a large waste of resources. If the blade is replaceable, it can better extend the service life of the tool.

For some cutting tools with simple structures, the blade thereof is easy to be assembled and disassembled, and the users can remove and replace the blade by themselves. However, for some cutting tools with complex structures, such as a ratchet pipe cutter, the non-professional person cannot operate to replace the blade, and once the blade is damaged, the whole cutting tool will lose its value.

Those skilled in the art devote themselves to developing a new blade-replaceable cutting tool, and regardless of whether the cutting component thereof is a simple fixed blade structure or a complex ratchet blade structure, the blade can be easily and quickly replaced, thereby effectively extending the service life of the cutting tool to avoid a waste of resources.

SUMMARY OF THE INVENTION

An object of the present invention is to provide a blade-replaceable cutting tool to solve the technical problems of the cutting tools with complex structures in the prior art, such as the ratchet pipe cutter, of which the blade is difficult to be replaced, and the whole cutting tool will be unusable after the blade is damaged.

In order to solve the above-mentioned technical problems, the present invention provides a blade-replaceable cutting tool including: a first handheld portion; a second handheld portion, rotatably connected to the first handheld portion; a blade mounting plate, rotatably mounted to the first handheld portion; and a blade, detachably mounted to the blade mounting plate.

Further, in a different implementation, the blade mounting plate includes a blade mounting plate body having a front end mounted with the blade; and an arcuate plate provided at a rear end of the blade mounting plate body and being a portion of the ratchet.

Further, in a different implementation, the arcuate plate is a portion of a ratchet, which includes: ratchet teeth, provided on an arcuate side wall of the arcuate plate; and a ratchet tooth clearance, provided between any two adjacent ratchet teeth; wherein the second handheld portion is provided with a first buckle and/or a second buckle on a side facing the first handheld portion, which is snapped into any one of the ratchet tooth clearances.

Further, in a different implementation, the blade mounting plate includes a blade mounting plate latch provided at the front end of the blade mounting plate body and connected to the middle of the arcuate plate; and a blade mounting plate bayonet provided between the blade mounting plate latch and the arcuate plate and having an opening direction facing the blade.

Further, in a different implementation, the blade includes: a ridge portion; a cutting edge portion, provided integrally with the ridge portion; a blade latch, provided at the edge of the blade, provided opposite to the cutting edge portion, and snapped into the blade mounting plate bayonet; and a blade bayonet, provided between the blade latch and the cutting edge portion, the blade mounting plate latch is snapped into the blade bayonet.

Further, in a different implementation, the blade mounting plate includes an elastic sheet mounting notch provided on a side of the arcuate plate remote from the arcuate side wall and having an opening direction facing the blade; the blade includes a blade fixing bayonet provided opposite to the elastic sheet mounting notch.

Further, in a different implementation, the elastic sheet mounting notch includes a first notch portion having an opening located on a side of the arcuate plate remote from the arcuate side wall; and a second notch portion communicated to the first notch portion and provided perpendicular to the first notch portion.

Further, in a different implementation, the blade mounting plate includes a first latch of the blade mounting plate provided at the front end of the blade mounting plate body; a second latch of the blade mounting plate provided at the middle of the blade mounting plate body and corresponding to the ridge portion; a third latch of the blade mounting plate provided at the middle of the blade mounting plate body and corresponding to the cutting edge portion; a first bayonet of the blade mounting plate provided between the first latch of the blade mounting plate and a locking member; and a second bayonet of the blade mounting plate provided between the second latch of the blade mounting plate and the third latch of the blade mounting plate; the blade includes: a ridge portion; a cutting edge portion provided integrally with the ridge portion; a first latch of the blade protruding from the ridge portion and snapped into the first bayonet of the blade mounting plate; a second latch of the blade protruding from the ridge portion and snapped into the second bayonet of the blade mounting plate; a first bayonet of the blade provided at the front end of the ridge portion; the first latch of the blade mounting plate is snapped into the first bayonet of the blade and is tangent to the first latch of the blade; a second bayonet of the blade provided at the rear end of the ridge portion; the second latch of the blade mounting plate is snapped into the second bayonet of the blade; and a third bayonet of the blade provided at the rear end of the cutting edge portion; the third latch of the blade mounting plate is snapped into the third bayonet of the blade and is tangent to the second latch of the blade.

Further, in a different implementation, the blade mounting plate includes an elastic member mounting notch communicated to the first bayonet of the blade mounting plate; and a locking member mounting notch communicated to the elastic member mounting notch; the blade includes a blade locking latch protruding from the first latch of the blade; and a blade locking bayonet enclosed by the blade locking latch, the first latch of the blade and the ridge portion; the blade-replaceable cutting tool further includes a locking member including the following components which are integrally provided: a locking lever, sliding within the locking member mounting notch and having a front end snapped into the blade locking bayonet; a locking block connected to the middle of the locking lever and sliding within the elastic member mounting notch; and an elastic member provided within the elastic member mounting notch, and one end of the elastic member is connected to a side wall of the locking block and the other end thereof is connected to an inner side wall of the elastic member mounting notch.

Further, in a different implementation, the blade-replaceable cutting tool further includes a first clamping plate attached and fixed to one side of the blade mounting plate; and a second clamping plate attached and fixed to the other side of the blade mounting plate; wherein the connection between the blade and the blade mounting plate is sandwiched between the first clamping plate and the second clamping plate.

Further, in a different implementation, the first clamping plate is provided with a first kidney-shaped slot; the second clamping plate is provided with a second kidney-shaped slot provided opposite to the first kidney-shaped slot; wherein the first kidney-shaped slot and the second kidney-shaped slot are provided opposite to a portion of the first notch portion and the blade fixing bayonet.

Further, in a different implementation, the blade-replaceable cutting tool further includes a toggle lever successively passing through the first kidney-shaped slot, the elastic sheet mounting notch and/or the blade fixing bayonet and the second kidney-shaped slot; and an elastic sheet provided within the elastic sheet mounting notch; one end of the elastic sheet is fixed to the blade mounting plate and the other end thereof is tangent to the side wall of the toggle lever.

Further, in a different implementation, the toggle lever includes a first toggle member including the following components which are formed integrally: a first toggle knob being tangent to the first clamping plate and exposed to the outside of the first clamping plate; and a first toggle post passing through the first kidney-shaped slot; and a second toggle member including the following components which are formed integrally: a second toggle knob being tangent to the second clamping plate; and a second toggle post passing through the second kidney-shaped slot and connected to the first toggle post.

Further, in a different implementation, the elastic sheet includes the following components which are formed integrally: a bent portion provided within the second notch portion; a linear portion provided within the first notch portion; and one end of the linear portion is connected to the bent portion and the other end thereof is tangent to the side wall of the toggle lever.

Further, in a different implementation, the blade-replaceable cutting tool further includes a blade pin mounting hole penetrating through the blade and located at a portion of the ridge portion close to the blade mounting plate; a first clamping plate pin mounting hole penetrating through the first clamping plate and provided opposite to the blade pin mounting hole; a second clamping plate pin mounting hole penetrating through the second clamping plate and provided opposite to the blade pin mounting hole; a pin successively passing through the second clamping plate pin mounting hole, the blade pin mounting hole and the first clamping plate pin mounting hole; one end of the pin is provided with a pin cap and a side wall of the other end thereof is provided with a sunken positioning slot; a positioning ball provided at the opening of the positioning slot; and a positioning spring having one end connected to the bottom of the positioning slot and the other end connected to the positioning ball.

Further, in a different implementation, the blade-replaceable cutting tool further includes a first control hole penetrating through the first clamping plate and provided opposite to the locking block; and a third toggle member protruding from a side of the locking block facing the first clamping plate and passing through the first control hole.

Further, in a different implementation, the blade-replaceable cutting tool further includes a second control hole penetrating through the second clamping plate and provided opposite to the front end of the locking lever; and a fourth toggle member protruding from a side of the front end of the locking lever facing the second clamping plate and passing through the second control hole.

Further, in a different implementation, the first clamping plate includes a first clamping plate arcuate plate provided at the rear end of the first clamping plate and being a portion of the ratchet; first clamping plate ratchet teeth provided on an arcuate side wall of the first clamping plate arcuate plate; and a first clamping plate ratchet tooth clearance provided between any two adjacent first clamping plate ratchet teeth.

Further, in a different implementation, the second clamping plate includes a second clamping plate arcuate plate provided at the rear end of the second clamping plate and being a portion of the ratchet; second clamping plate ratchet teeth provided on an arcuate side wall of the second clamping plate arcuate plate; and a second clamping plate ratchet tooth clearance provided between any two adjacent second clamping plate ratchet teeth.

Further, in a different implementation, the blade-replaceable cutting tool further includes a first fastener fixing the first clamping plate and the second clamping plate to both sides of the blade mounting plate; and a second fastener successively fixing a first side wall of the first handheld portion, the first clamping plate, the blade mounting plate, the second clamping plate, and a second side wall of the first handheld portion together.

Further, in a different implementation, the first side wall of the first handheld portion is provided with a first side wall through hole of the first handheld portion; the second side wall of the first handheld portion is provided with a second side wall through hole of the first handheld portion; the first clamping plate is provided with a first clamping plate through hole; the second clamping plate is provided with a second clamping plate through hole; the blade mounting plate is provided with a blade mounting plate through hole; wherein the second fastener successively passes through the first side wall through hole of the first handheld portion, the first clamping plate through hole, the blade mounting plate through hole, the second clamping plate through hole, and the second side wall through hole of the first handheld portion.

Further, in a different implementation, the first handheld portion includes a first side wall of the first handheld portion; a second side wall of the first handheld portion provided opposite to the first side wall of the first handheld portion; and a first handheld portion opening cavity enclosed by the first side wall of the first handheld portion and the second side wall of the first handheld portion and having an opening direction facing the second handheld portion; wherein the blade mounting plate and the blade are provided within the first handheld portion opening cavity.

Further, in a different implementation, the first handheld portion further includes a first arcuate groove provided at the edge of the first side wall of the first handheld portion; and a second arcuate groove provided at the edge of the second side wall of the first handheld portion and provided opposite to the first arcuate groove; wherein the first arcuate groove and the second arcuate groove are provided on both sides of the opening of the first handheld portion opening cavity, respectively.

Further, in a different implementation, the second handheld portion includes a first side wall of the second handheld portion; a second side wall of the second handheld portion provided integrally with the first side wall of the second handheld portion and opposite to the first side wall of the second handheld portion; and a second handheld portion opening cavity having an opening direction facing the first handheld portion.

Further, in a different implementation, the blade-replaceable cutting tool includes a first elastic member having one end fixed to the first handheld portion and the other end fixed to the blade mounting plate; and a second elastic member having one end fixed to the first handheld portion and the other end fixed to the second handheld portion.

Further, in a different implementation, the blade-replaceable cutting tool further includes a first pin perpendicularly assembled on the inner side of the two side walls of the first handheld portion; the first handheld portion and the second handheld portion are rotatably sleeved on the first pin; a first buckle having a rear end rotatably sleeved on the first pin and a front end snapped into any one of the ratchet tooth clearances; and a first elastic member having one end connected to the first handheld portion and the other end connected to the first buckle. The first elastic member is a torsion spring.

Further, in a different implementation, the blade-replaceable cutting tool further includes a second pin perpendicularly assembled on the inner side of the two side walls of the second handheld portion; a second buckle having a rear end rotatably sleeved on the second pin and a front end snapped into any one of the ratchet tooth clearances; and a second elastic member having one end connected to the second handheld portion and the other end connected to the second buckle. The second elastic member is a torsion spring sleeved on the second pin and having one end connected to the first handheld portion and the other end detachably connected to the second buckle.

Further, in a different implementation, the blade-replaceable cutting tool further includes a third elastic member having one end fixed to the first handheld portion and the other end fixed to the blade mounting plate. The third elastic member is an extension spring.

In order to solve the above-mentioned technical problems, the present invention further provides another blade-replaceable cutting tool, including: a first handheld portion; a second handheld portion rotatably connected to the first handheld portion; and a ratchet blade detachably and rotatably mounted to the first handheld portion.

Further, in a different implementation, the blade-replaceable cutting tool further includes a detachable pin provided at the connection between the first handheld portion and the ratchet blade, and the first handheld portion and the ratchet blade can be rotated about the detachable pin.

Further, in a different implementation, the blade-replaceable cutting tool further includes a first side wall through hole of the first handheld portion penetrating through the first side wall of the first handheld portion; a second side wall through hole of the first handheld portion penetrating through the second side wall of the first handheld portion; and a blade through hole penetrating through the ratchet blade; wherein the detachable pin successively passes through the first side wall through hole of the first handheld portion, the blade through hole and the second side wall through hole of the first handheld portion.

Further, in a different implementation, the detachable pin includes a hollow shaft including the following components which are formed integrally: a hollow shaft sleeve successively passing through the first side wall through hole of the first handheld portion, the blade through hole and the second side wall through hole of the first handheld portion; and a shaft sleeve base exposed to the outside of the first side wall of the first handheld portion; and a rotating member including the following components which are formed integrally: a rotating shaft inserted and threadedly connected to the hollow shaft sleeve; and a rotating shaft base exposed to the outside of the second side wall of the first handheld portion and having an outer surface provided with a flat or cross-shaped groove.

Further, in a different implementation, the detachable pin includes a nut exposed to the outside of the first side wall of the first handheld portion; and a screw having a front end inserted and threadedly connected to the nut and a rear end provided with a screw base; the screw base is exposed to the outside of the second side wall of the first handheld portion and has an outer surface provided with a flat or cross-shaped groove.

Further, in a different implementation, the ratchet blade includes a cutting portion provided at the front end of the ratchet blade; an arcuate plate provided at the rear end of the ratchet blade; and a connecting portion used for connecting the cutting portion and the arcuate plate and rotatably connected to the first handheld portion.

Further, in a different implementation, the cutting portion includes a ridge portion facing the outside of the first handheld portion; and a cutting edge portion facing a second opening of the first handheld portion.

Further, in a different implementation, the cutting edge portion is linear or arcuate.

Further, in a different implementation, the arcuate plate is a portion of the ratchet, which includes ratchet teeth provided on the arcuate side wall of the arcuate plate; and a ratchet tooth clearance provided between any two adjacent ratchet teeth; wherein the second handheld portion is provided with a first buckle and/or a second buckle on the side facing the first handheld portion, which is snapped into any one of the ratchet tooth clearances.

Further, in a different implementation, the arcuate plate includes an arcuate plate snap hole penetrating through one end of the arcuate plate and snapped by one end of the third elastic member.

Further, in a different implementation, the connecting portion includes a connecting portion snap slot sunken to the side wall of the connecting portion and snapped by one end of the third elastic member.

Further, in a different implementation, the first handheld portion includes a first side wall of the first handheld portion; a second side wall of the first handheld portion provided opposite to the first side wall of the first handheld portion; and a first handheld portion opening cavity enclosed by the first side wall of the first handheld portion and the second side wall of the first handheld portion; which includes: a first opening of the first handheld portion facing the second handheld portion; and a second opening of the first handheld portion facing the outside of the first handheld portion; wherein a portion of the ratchet blade is provided within the first handheld portion opening cavity.

Further, in a different implementation, the first handheld portion further includes a first arcuate groove provided at the edge of the first side wall of the first handheld portion; a second arcuate groove provided at the edge of the second side wall of the first handheld portion and provided opposite to the first arcuate groove; wherein the first arcuate groove and the second arcuate groove are provided on both sides of the second opening, respectively.

Further, in a different implementation, the second handheld portion includes a first side wall of the second handheld portion; a second side wall of the second handheld portion provided integrally with the first side wall of the second handheld portion and opposite to the first side wall of the second handheld portion; and a second handheld portion opening cavity having an opening direction facing the first handheld portion.

Further, in a different implementation, the blade-replaceable cutting tool further includes a first pin perpendicularly assembled on the inner side of the two side walls of the first handheld portion; the first handheld portion and the second handheld portion are rotatably sleeved on the first pin; a first buckle having a rear end rotatably sleeved on the first pin and a front end snapped into any one of the ratchet tooth clearances; a first elastic member having one end connected to the first handheld portion and the other end connected to the first buckle.

Further, in a different implementation, the first elastic member is an extension spring.

Further, in a different implementation, the blade-replaceable cutting tool further includes a second pin perpendicularly assembled on the inner side of the two side walls of the second handheld portion; a second buckle having a rear end rotatably sleeved on the second pin and a front end snapped into any one of the ratchet tooth clearances; and a second elastic member having one end connected to the second handheld portion and the other end connected to the second buckle.

Further, in a different implementation, the second elastic member is a torsion spring sleeved on the second pin and having one end connected to the first handheld portion and the other end detachably connected to the second buckle.

Further, in a different implementation, the blade-replaceable cutting tool further includes a third elastic member having one end fixed to the first handheld portion and the other end fixed to the ratchet blade.

Further, in a different implementation, the third elastic member is a torsion spring sleeved on a torsion spring mounting shaft, one end of the third elastic member is fixed to the first handheld portion and the other end thereof is connected to the ratchet blade; both ends of the torsion spring mounting shaft are perpendicularly fixed to the inner side of the two side walls of the first handheld portion.

Further, in a different implementation, one end of the torsion spring is fixed to the first handheld portion and the other end thereof is snapped into the arcuate plate snap hole or the connecting portion snap slot of the ratchet blade.

The beneficial effect of the present invention is to provide a blade-replaceable cutting tool, which can achieve the quick replacement of the blade and is simple to operate and convenient to use; it requires lower manipulative ability, and an ordinary user can replace the blade, which can effectively extend the overall service life of the cutting tool.

Figure 1:
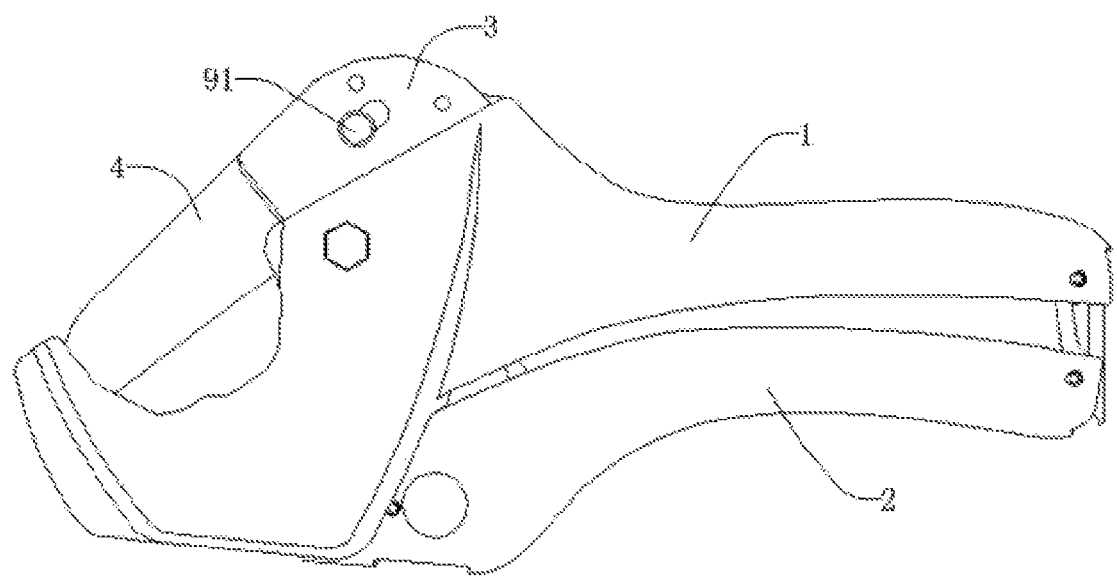
FIG. 1 is a schematic view of the overall structure of Embodiment 1 of the present invention in the locked state.

The components in the figures are identified as follows: 1 first handheld portion, 2 second handheld portion, 3 blade mounting plate, 4 blade, 5 ratchet blade; 6 detachable pin, 7 first clamping plate, 8 second clamping plate, 9 first fastener, 10 second fastener; 11 first side wall of the first handheld portion, 12 second side wall of the first handheld portion, 13 first handheld portion opening cavity; 14 first pin, 15 first buckle, 16 first elastic member, 17 first arcuate groove; 18 second arcuate groove, 19 third elastic member, 20 torsion spring mounting shaft; 21 first side wall of the second handheld portion, 22 second side wall of the second handheld portion, 23 second handheld portion opening cavity; 24 second pin, 25 second buckle, 26 second elastic member, 27 handheld portion fixing device; 31 blade mounting plate body, 32 arcuate plate, 33 blade mounting plate through hole, 34 blade mounting plate latch; 35 blade mounting plate bayonet, 36 elastic sheet mounting notch; 41 ridge portion, 42 cutting edge portion, 43 blade latch, 44 blade bayonet, 45 blade fixing bayonet, 46 blade pin mounting hole; 51 cutting portion, 52 arcuate plate, 53 connecting portion, 54 blade through hole; 61 hollow shaft, 62 rotating member, 63 nut, 64 screw, 65 screw base; 71 first clamping plate through hole, 72 first kidney-shaped slot, 73 first clamping plate pin mounting hole, 74 first control hole; 75 first clamping plate arcuate plate, 76 first clamping plate ratchet teeth, 77 first clamping plate ratchet tooth clearance; 81 second clamping plate through hole, 82 second kidney-shaped slot, 83 second clamping plate pin mounting hole, 84 second control hole; 85 second clamping plate arcuate plate, 86 second clamping plate ratchet teeth, 87 second clamping plate ratchet tooth clearance; 91 toggle rod, 92 elastic sheet, 93 locking member, 94 fourth elastic member; 95 pin, 96 positioning ball, 97 positioning spring, 98 pin cap, 99 positioning slot; 101 nut base, 102 stem nut, 103 screw base, 104 screw; 111 first side wall through hole of the first handheld portion; 121 second side wall through hole of the first handheld portion; 131 first opening of the first handheld portion, 132 second opening of the first handheld portion; 311 first latch of the blade mounting plate, 312 second latch of the blade mounting plate, 313 third latch of the blade mounting plate, 314 first bayonet of the blade mounting plate; 315 second bayonet of the blade mounting plate, 316 elastic member mounting notch, 317 locking member mounting notch; 321 ratchet teeth, 322 ratchet tooth clearance; 361 first notch portion, 362 second notch portion; 411 first latch of the blade, 412 second latch of the blade, 413 first bayonet of the blade, 414 second bayonet of the blade; 415 third bayonet of the blade, 416 blade locking latch, 417 blade locking bayonet; 431 edge of the blade, 511 ridge portion, 512 cutting edge portion, 521 ratchet teeth, 522 ratchet tooth clearance; 531 connecting portion snap slot, 532 arcuate plate snap hole; 611 hollow shaft sleeve, 612 shaft sleeve base, 621 rotating shaft, 622 rotating shaft base; 911 first toggle knob, 912 first toggle post, 913 second toggle knob, 914 second toggle post; 921 linear portion, 922 bent portion; 931 locking lever, 932 locking block, 933 third toggle member, 934 fourth toggle member.

DETAILED DESCRIPTION OF THE PREFERRED EMBODIMENTS

The preferred embodiments of the present invention will be described fully hereafter with reference to the accompanying drawings of the description, so that the technical contents thereof will be more clearly and easily understood. The present invention may be embodied in many different forms of embodiments, and the protection scope thereof is not limited to the embodiments mentioned herein.

In the drawings, the components having same structures are denoted by same reference numerals, and the components having similar structures or functions are denoted by similar reference numerals. The dimension and thickness of each of the components shown in the drawings are shown arbitrarily, and the present invention does not limit the dimension and thickness of each of the components. In order to make the illustration clearer, the thickness of the components is appropriately exaggerated in some places in the drawings.

The directional words mentioned in the present invention such as upper, lower, front, rear, left, right, inner, outer, side, top, bottom, top end, bottom end, distal end, etc., are only the directions in the drawings and are only intended to explain and illustrate the present invention, but not to limit the protection scope of the present invention.

When a certain component is described as being "on" another component, the component may be placed directly on another component; an intermediate component may also be present, on which the component is placed, and the intermediate component is placed on another component. When a component is described as being "mounted to" or "connected to" another component, the two may be understood to be directly "mounted" or "connected", or one component is indirectly "mounted to" or "connected to" another component via an intermediate component.

Embodiment 1

Figure 2:
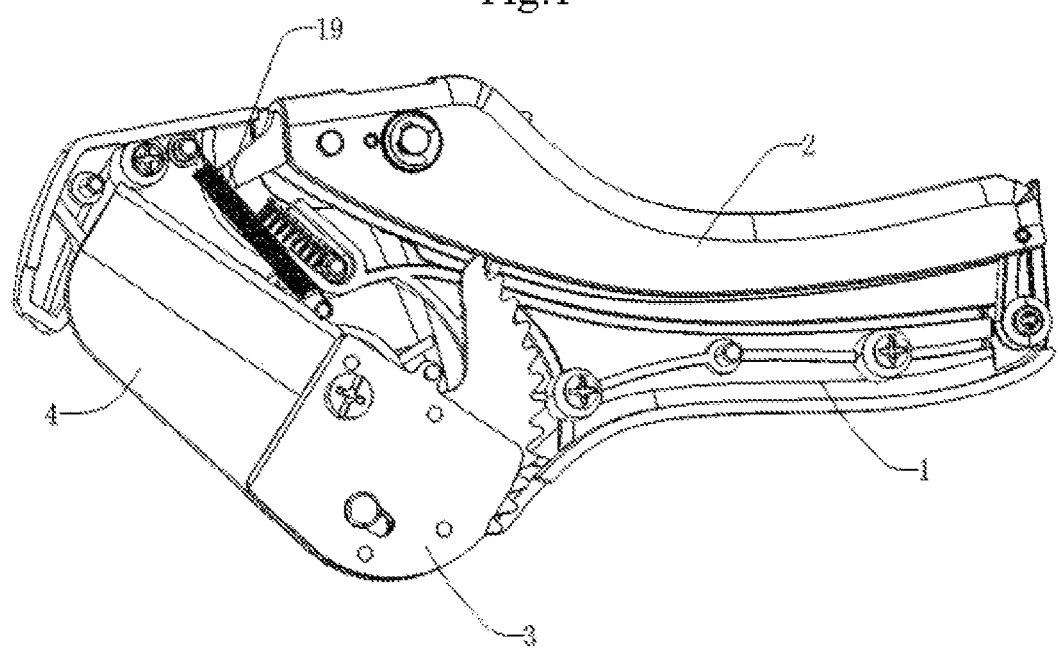
FIG. 2 is a structural schematic view of Embodiment 1 of the present invention with the first side wall of the first handheld portion removed.

As shown in FIGS. 1 to 2, this embodiment provides a blade-replaceable cutting tool, including a first handheld portion 1, a second handheld portion 2, a blade mounting plate 3, and a blade 4.

Figure 3:
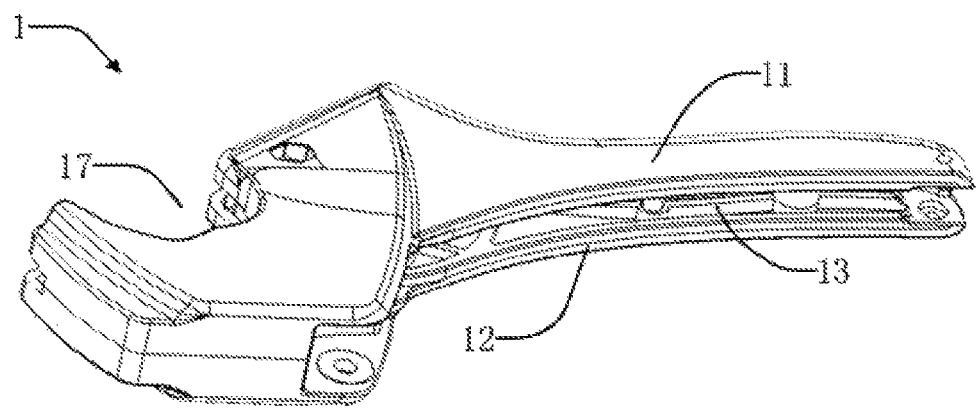
FIG. 3 is a structural schematic view of the first handheld portion according to Embodiment 1 of the present invention.

As shown in FIG. 3, the first handheld portion 1 includes a first side wall 11 of the first handheld portion and a second side wall 12 of the first handheld portion which are opposite to each other and provided integrally, and the first side wall 11 of the first handheld portion and the second side wall 12 of the first handheld portion enclose a first handheld portion opening cavity 13 having an opening direction facing the second handheld portion 2; the blade mounting plate 3 and a portion of the blade 4 are provided within the first handheld portion opening cavity 13.

Figure 4:
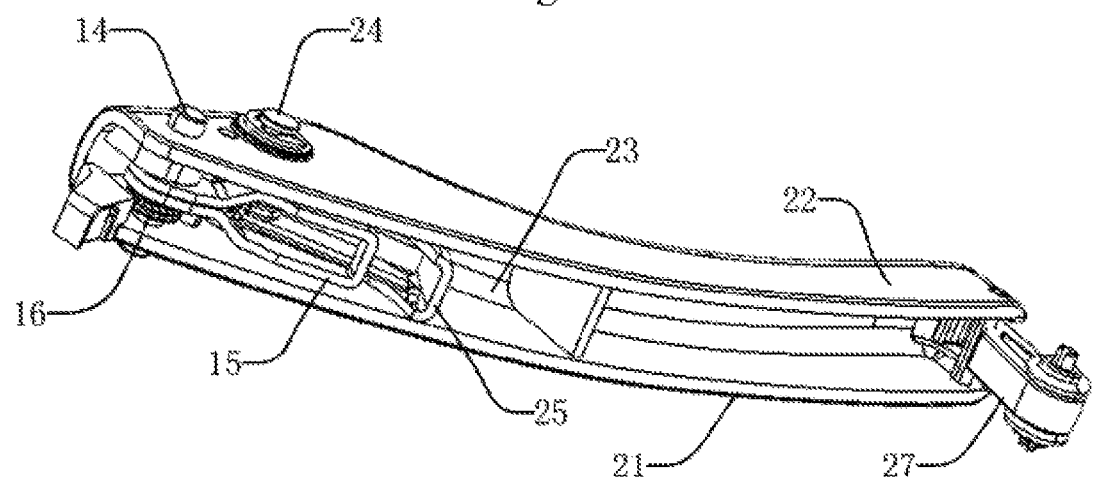
FIG. 4 is a structural schematic view of the second handheld portion according to Embodiment 1 of the present invention.
Figure 5:
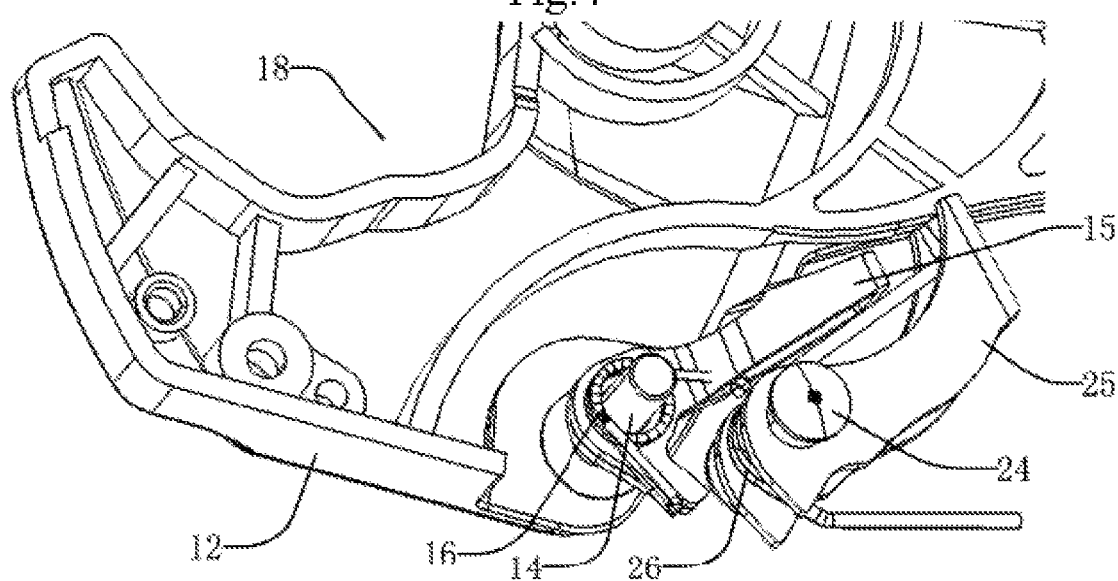
FIG. 5 is a structural schematic view of some components inside the first and second handheld portions according to Embodiment 1 of the present invention.

As shown in FIG. 4, this embodiment further includes a first pin 14, a first buckle 15, and a first elastic member 16, and the first pin 14 is perpendicularly assembled to the inner side of the two side walls 11, 12 of the first handheld portion 1; the first handheld portion 1 and the second handheld portion 2 are rotatably sleeved on the first pin 14. The rear end of the first buckle 15 is rotatably sleeved on the first pin 14 and the front end thereof is snapped into any one of the ratchet tooth clearances 322. One end of the first elastic member 16 is connected to the first handheld portion 1 and the other end thereof is connected to the first buckle 15, the first elastic member 16 in this embodiment is preferably a torsion spring, so that the first buckle 15 can be rotated within a certain range. As shown in FIGS. 4 to 5, the end of the first handheld portion 1 mounted with the blade 4 further includes a first arcuate groove 17 and a second arcuate groove 18, and the first arcuate groove 17 is provided at the edge of the first side wall 11 of the first handheld portion; the second arcuate groove 18 is provided at the edge of the second side wall 12 of the first handheld portion and is provided opposite to the first arcuate groove 17; and the first arcuate groove 17 and the second arcuate groove 18 are provided on both sides of the opening of the first handheld portion opening cavity 13, respectively, and the two arcuate grooves 17, 18 are used for placing and fixing a pipe to achieve the function of cutting the pipe. The blade 4 directly faces the first handheld portion opening cavity 13, and the blade 4 falls into the first handheld portion opening cavity 13 after the cutting process is completed.

As shown in FIGS. 4 to 5, the second handheld portion 2 is rotatably connected to the first handheld portion 1. The second handheld portion 2 includes a first side wall 21 of the second handheld portion and a second side wall 22 of the second handheld portion which are opposite to each other and provided integrally, and the first side wall 21 of the second handheld portion and the second side wall 22 of the second handheld portion enclose a second handheld portion opening cavity 23, and the second handheld portion opening cavity 23 has an opening direction facing the first handheld portion 1.

As shown in FIGS. 4 to 5, this embodiment further includes a second pin 24, a second buckle 25, and a second elastic member 26, and the second pin 24 is perpendicularly assembled to the inner side of two side walls 21, 22 of the second handheld portion 2. The rear end of the second buckle 25 is rotatably sleeved on the second pin 24 and the front end thereof is snapped into any one of the ratchet tooth clearances 322; one end of the second elastic member 16 is connected to the second handheld portion 2 and the other end thereof is connected to the second buckle 25. The second elastic member 26 is preferably a torsion spring which is sleeved on the second pin 24, and one end of the torsion spring is connected to the first handheld portion 1 and the other end thereof is detachably connected to the second buckle 25, so that the second buckle 25 can be rotated within a certain range.

In this embodiment, the first buckle 15 or the second buckle 25, under the action of the first elastic member 16 or the second elastic member 26, is snapped into the ratchet tooth clearance at an appropriate position, and during the cutting of the pipe, the two buckles can assist the blade in exerting a force to cut the pipe located between the blade 4 and the two arcuate grooves 17, 18, thereby achieving a labor-saving effect. Pipe will vibrate during the cutting, resulting in discomfort of user's hand, the first elastic member 16 or the second elastic member 26 may have the function of damping and cushioning. The first elastic member 16 and the second elastic member 26 may assist in closing or opening of the first handheld portion 1 and the second handheld portion 2, and the operation principle thereof is the same as that of the same type of pipe cutter and will not be described here.

As shown in FIG. 2, this embodiment further includes a third elastic member 19 having one end connected to the first handheld portion 1 and the other end connected to the blade mounting plate 3, and the third elastic member 19 is preferably an extension spring. In this embodiment, during the opening or closing of the first handheld portion 1 and the second handheld portion 2, the third elastic member 19 assists in exerting a force or limits the range of movement of the blade mounting plate 3 and the blade 4, which can ensure that the opening angle is within an appropriate range to prevent the components from being damaged and to reduce the security risk during use.

The distal end of the second handheld portion 2 is provided with a handheld portion fixing device 27 having one end hinged to the distal end of the second handheld portion 2 and the other end detachably mounted to the distal end of the first handheld portion 1 for closing the first handheld portion 1 and the second handheld portion 2.

Figure 6:
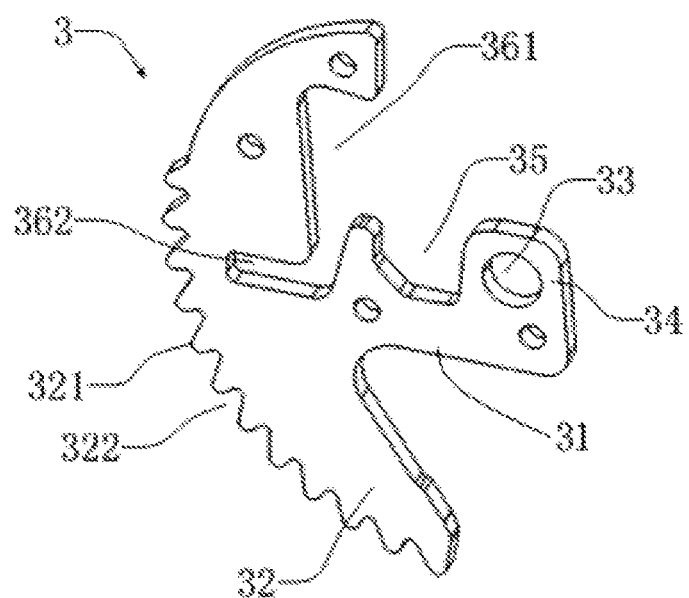
FIG. 6 is a structural schematic view of the blade mounting plate according to Embodiment 1 of the present invention.

As shown in FIG. 6, the blade mounting plate 3 is rotatably mounted to the first handheld portion 1, the blade mounting plate 3 includes a blade mounting plate through hole 33, and the blade mounting plate 3 can be rotated with the central axis of the blade mounting plate through hole 33 as the axis of rotation. The blade 4 is detachably mounted to the blade mounting plate 3, preferably, the blade 4 is in the same plane as the blade mounting plate 3, the blade 4 is integrally combined with the blade mounting plate 3, and the outer edge shape, the working principle and the functions thereof are substantially equivalent to that of a complete ratchet blade. The blade mounting plate 3 includes a blade mounting plate body 31 having a front end mounted with the blade 4 and a rear end provided with an arcuate plate 32, the arcuate plate 32 is a portion of the ratchet, the arcuate plate 32 includes an arcuate side portion and a non-arcuate side portion, and the side wall thereof includes an arcuate side wall and a non-arcuate side wall; the arcuate side wall of the arcuate plate 32 is provided with a plurality of equally spaced ratchet teeth 321, and the arcuate side wall of the arcuate plate 32 faces the second handheld portion 2; a ratchet tooth clearance 322 is formed between any two adjacent ratchet teeth 321 so that the first buckle 15 or the second buckle 25 provided within the second handheld portion opening cavity 23 is snapped into any one of the ratchet tooth clearances 322.

This embodiment is opened and closed when in use, the first handheld portion 1 and the second handheld portion 2 are relatively rotated, and the arcuate plate 32 of the blade mounting plate 3 cooperates with the first buckle 15 and the second buckle 25, so that the blade 4 can achieve an effective cutting operation, the working principle of which is the same as that of the existing ratchet type pipe cutter and will not be described here.

Figure 7:
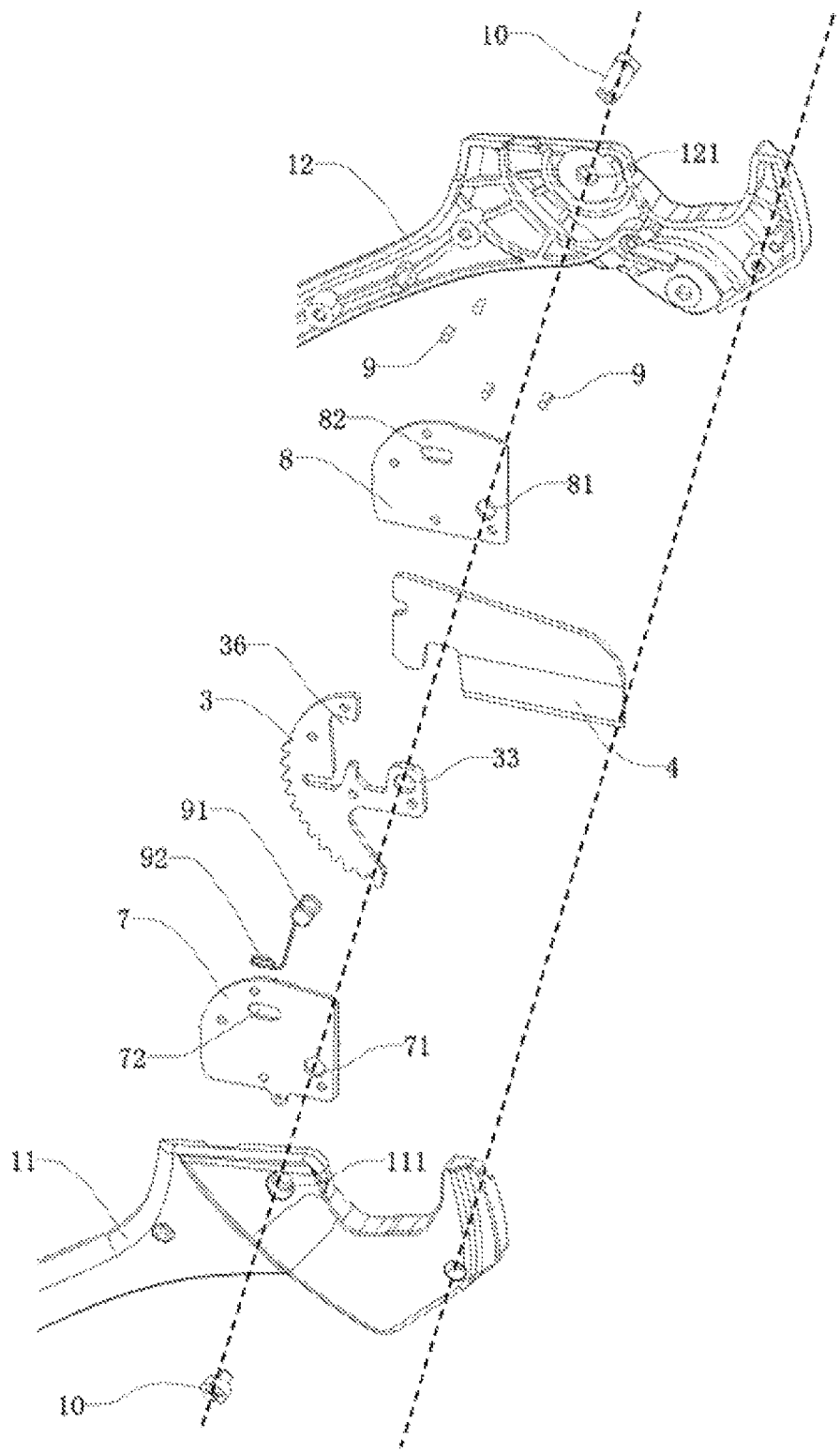
FIG. 7 is an exploded structural schematic view of the cutting structure and the first handheld portion according to Embodiment 1 of the present invention.

As shown in FIG. 7, this embodiment further includes a first clamping plate 7 and a second clamping plate 8 for fixing the blade 4 and the blade mounting plate 3. The first clamping plate 7 is attached and fixed to one side of the blade mounting plate 3; the second clamping plate 8 is attached and fixed to the other side of the blade mounting plate 3; the connection between the blade 4 and the blade mounting plate 3 is sandwiched between the first clamping plate 7 and the second clamping plate 8.

This embodiment further includes a first fastener 9 and a second fastener 10. The first fastener 9 fixes the first clamping plate 7 and the second clamping plate 8 to both sides of the blade mounting plate 3; the edges of the first clamping plate 7, the second clamping plate 8 and the blade mounting plate 3 are provided with a plurality of fastener mounting holes (not shown) in the positions corresponding to them, respectively, and the first fastener 9 includes, but is not limited to, a rivet or a bolt, and successively passes through the first clamping plate 7, the blade mounting plate 3, and the second clamping plate 8, thereby assembling the first clamping plate 7, the second clamping plate 8 and the blade mounting plate 3 together.

The second fastener 10 successively assembles the first side wall 11 of the first handheld portion, the first clamping plate 7, the blade mounting plate 3, the second clamping plate 8, and the second side wall of the first handheld portion 12 together, so that the blade mounting plate 3 is hinged to the first handheld portion 1, both of which may be relatively rotated.

Specifically, the first side wall 11 of the first handheld portion is provided with a first side wall through hole 111 of the first handheld portion; the second side wall 12 of the first handheld portion is provided with a second side wall through hole 121 of the first handheld portion; the first clamping plate 7 is provided with a first clamping plate through hole 71; the second clamping plate 8 is provided with a second clamping plate through hole 81; and the blade mounting plate 3 is provided with a blade mounting plate through hole 33. The second fastener 10 includes, but is not limited to, a bolt, and successively passes through the first side wall through hole 111 of the first handheld portion, the first clamping plate through hole 71, the blade mounting plate through hole 33, the second clamping plate through hole 81, and the second side wall through hole 121 of the first handheld portion.

Figure 8:
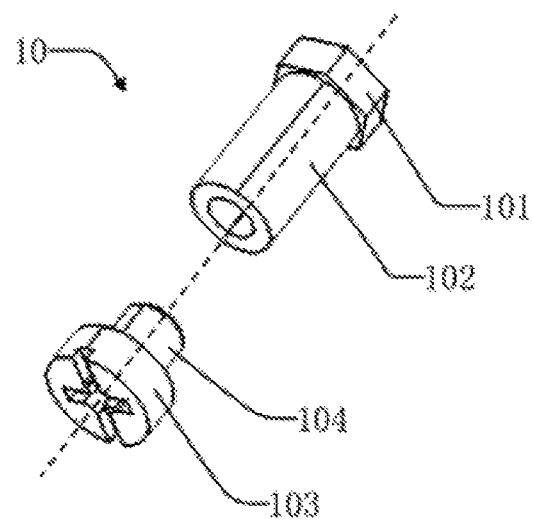
FIG. 8 is a structural schematic view of the second fastener according to Embodiment 1 of the present invention.

As shown in FIGS. 7 to 8, the second fastener 10 is preferably a bolt including a nut portion and a screw portion, the nut portion includes a nut base 101 and a stem nut 102 which are formed integrally, and the screw portion includes a screw base 103 and a screw 104 which are formed integrally. The nut base 101 is attached to the outer surface of the first side wall 11 of the first handheld portion; and the screw base 103 is attached to the outer surface of the second side wall 12 of the first handheld portion. The stem nut 102 is perpendicularly fixed to the nut base 101, and successively passes through the first side wall through hole 111 of the first handheld portion, the first clamping plate through hole 71, the blade mounting plate through hole 33, the second clamping plate through hole 81, and the second side wall through hole 121 of the first handheld portion. The stem nut 102 is provided with a threaded cavity at its center, and the screw 104 is rotatably and threadedly connected to the threaded cavity for adjusting the relative position of the nut base 101 and the screw base 103.

The blade mounting plate 3, the blade 4, the first clamping plate 7, and the second clamping plate 8 collectively constitute a cutting structure, and the cutting structure of this embodiment is a ratchet type component.

As shown in FIG. 6, in this embodiment, the blade mounting plate 3 includes a blade mounting plate latch 34 and a blade mounting plate bayonet 35. The blade mounting plate latch 34 is provided at the front end of the blade mounting plate body 31 and is connected to the non-arcuate side portion at the middle of the arcuate plate 32; the blade mounting plate bayonet 35 is provided between the blade mounting plate latch 34 and the arcuate plate 32 and has an opening direction facing the blade 4.

Figure 9:
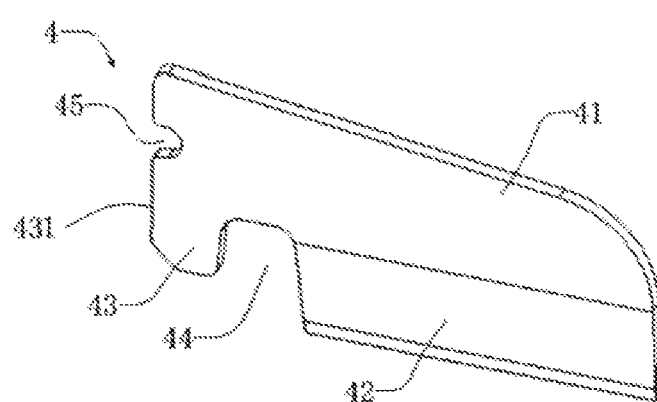
FIG. 9 is a structural schematic view of the blade according to Embodiment 1 of the present invention.

As shown in FIGS. 6 and 9, in this embodiment, the blade 4 includes a ridge portion 41 and a cutting edge portion 42 which are provided integrally, and further includes a blade latch 43 and a blade bayonet 44. The blade latch 43 is provided at the edge 431 of the blade 4 and is provided opposite to the cutting edge portion 42 and is in the same direction as the cutting edge portion 42, and the blade latch 43 is snapped into the blade mounting plate bayonet 35. The blade bayonet 44 is provided between the blade latch 43 and the cutting edge portion 42 and the blade mounting plate latch 34 is snapped into the blade bayonet 44, so that the blade mounting plate 3 is assembled integrally with the blade 4 and remains relatively stable.

As shown in FIGS. 6, 7 and 9, the blade mounting plate 3 further includes an elastic sheet mounting notch 36, the elastic sheet mounting notch 36 is provided on a side of the arcuate plate 32 remote from the arcuate side wall and has an opening direction facing the blade 4, and is used to assemble the elastic sheet. The elastic sheet mounting notch 36 includes a first notch portion 361 and a second notch portion 362, the opening of the first notch portion 361 is located on a side of the arcuate plate 32 remote from the arcuate side wall; and the second notch portion 362 is communicated to the first notch portion 361 and is provided perpendicular to the first notch portion 361. The blade 4 includes a blade fixing bayonet 45 which is provided opposite to the elastic sheet mounting notch 35, specifically, which directly faces a portion of the first notch portion 361.

As shown in FIG. 7, the first clamping plate 7 is provided with a first kidney-shaped slot 72, the second clamping plate 8 is provided with a second kidney-shaped slot 82 provided opposite to the first kidney-shaped slot 72; the first kidney-shaped slot 72 and the second kidney-shaped slot 82 are provided opposite to a portion of the first notch portion 361 and the blade fixing bayonet 45, which constitute a toggle through hole penetrating through all of the first clamping plate 7, the blade mounting plate 3 and the second clamping plate 8 for placing the toggle lever 91.

Figure 10:
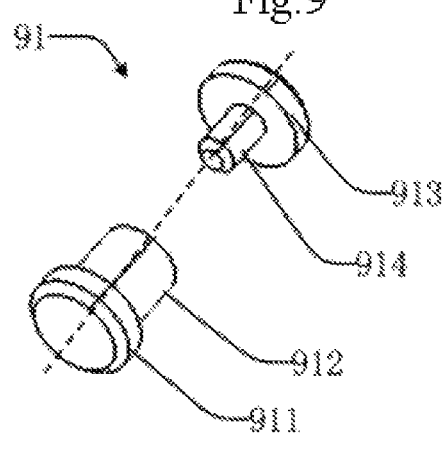
FIG. 10 is a structural schematic view of the toggle lever according to Embodiment 1 of the present invention.

As shown in FIGS. 7 and 10, this embodiment further includes a toggle lever 91, and the toggle lever 91 successively passes through the first kidney-shaped slot 72, the elastic sheet mounting notch 36 and/or the blade fixing bayonet 45 and the second kidney-shaped slot 82. The toggle lever 91 includes a first toggle member and a second toggle member which are connected to each other. The first toggle member includes a first toggle knob 911 and a first toggle post 912 which are formed integrally, and the second toggle member includes a second toggle knob 913 and a second toggle post 914 which are formed integrally.

As shown in FIGS. 1, 2, and 10, the first toggle member and the second toggle member are respectively inserted into the first kidney-shaped slot 72 and the second kidney-shaped slot 82 from both sides of the blade mounting frame 3 and are combined into a toggle lever 91. The first toggle knob 911 is tangent to the first clamping plate 71 and is exposed to the outside of the first clamping plate 7; the second toggle knob 913 is tangent to the second clamping plate 82 and is exposed to the outside of the second clamping plate 8. The first toggle post 912 passes through the first kidney-shaped slot 72; and the second toggle post 914 passes through the second kidney-shaped slot 82 and is connected to the first toggle post 912. The middle of the first toggle post 912 is a threaded cavity, and the second toggle post 914 is inserted into the cavity of the first toggle post 912. The first toggle knob 911 is exposed to the outside of the first handheld portion 1 so that the user can replace the blade by using the toggle lever 91.

Figure 11:
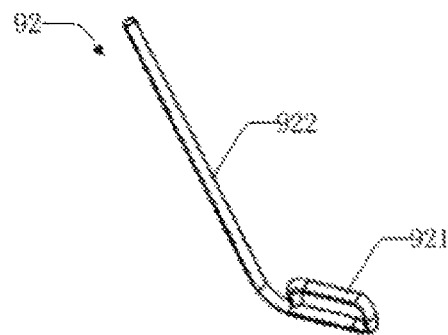
FIG. 11 is a structural schematic view of the elastic sheet according to Embodiment 1 of the present invention.
Figure 12:
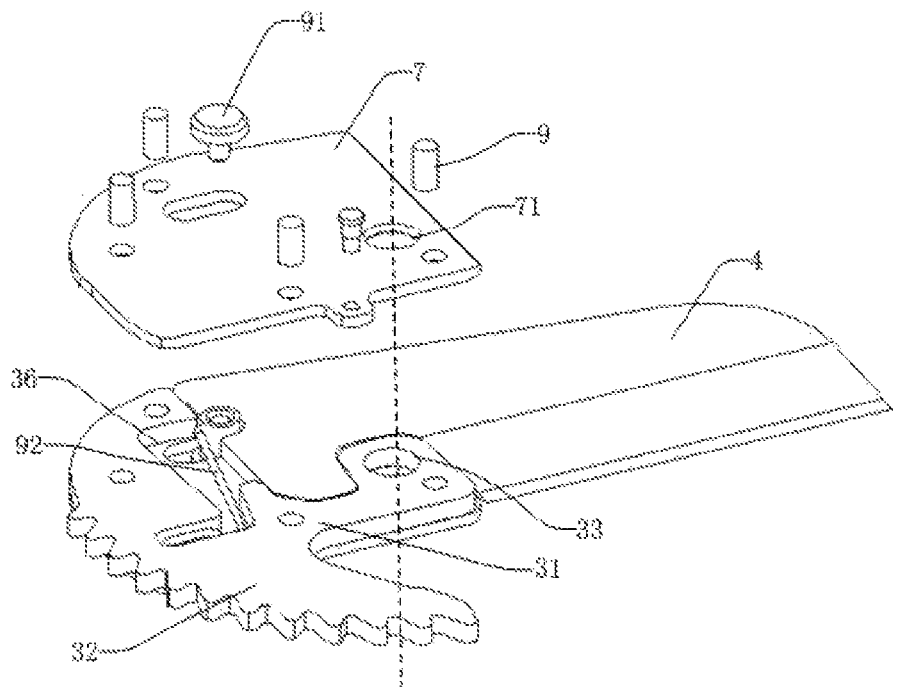
FIG. 12 is an exploded structural schematic view of the cutting structure according to Embodiment 1 of the present invention.

As shown in FIGS. 11 and 12, this embodiment further includes an elastic sheet 92 provided within the elastic sheet mounting notch 36; one end of the elastic sheet 92 is fixed to the blade mounting plate 3 and the other end thereof is tangent to the side wall of the toggle lever 91, and specifically, the elastic sheet 92 is tangent to the side wall of the first toggle post 912 for pressing the first toggle post 912 against the blade fixing bayonet 45 so that the blade 4 is fixed to the blade mounting plate 3. When the first toggle knob 911 is toggled, the first toggle post 912 is disengaged from the blade fixing bayonet 45 and the blade 4 can be removed in the direction of the cutting edge thereof.

The elastic sheet 92 includes a linear portion 921 and a bent portion 922 which are formed integrally, and the linear portion 921 is provided within the first notch portion 361; the bent portion 922 is provided within the second notch portion 362; one end of the linear portion 921 is connected to the bent portion 922 and the other end thereof is tangent to the side wall of the toggle lever 91 (the first toggle post 912). As shown in FIGS. 1, 11 and 12, when the blade 4 is mounted on the blade mounting plate 3, the toggle lever 91 is in the locked position, the elastic sheet 92 is slightly deformed, and the toggle lever 91 is pressed in the blade fixing bayonet 45. Since the blade latch 43 is snapped into the blade mounting plate bayonet 35 and the blade mounting plate bayonet 34 is snapped into the blade bayonet 44, the blade 4 is locked on the blade mounting plate 3 so that the cutting tool according to this embodiment can be used normally, and the specific use method thereof is the same as that of the blade fixed pipe cutter and will not be described here.

Figure 13:
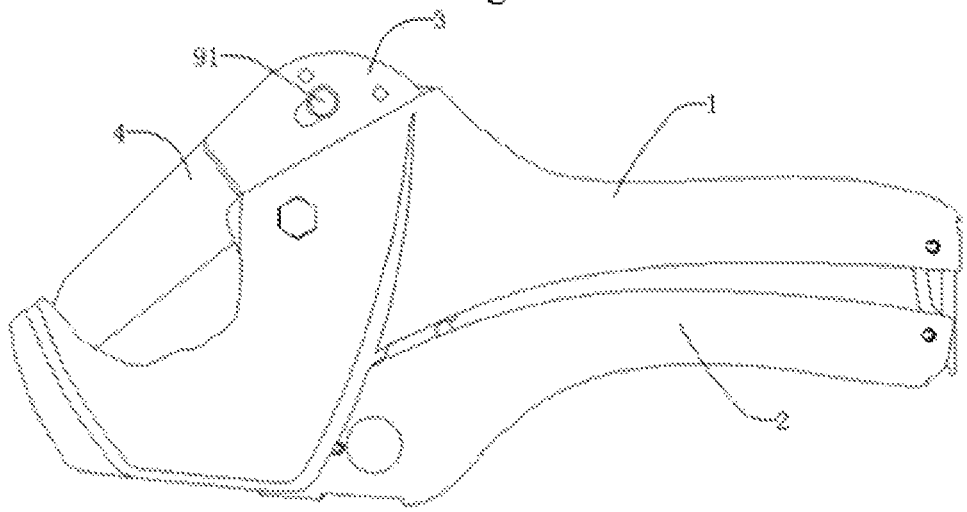
FIG. 13 is a schematic view of the overall structure of Embodiment 1 of the present invention in the unlocked state.

As shown in FIG. 13, when the blade 4 is damaged and the blade 4 needs to be replaced, it is only necessary to toggle the toggle lever 91 from the locked position 93 to the unlocked position, the elastic sheet 92 is greatly deformed, and the toggle lever 91 is disengaged from the blade fixing bayonet 45 and slides into the elastic sheet mounting notch 36, whereby the user can pull out the blade 4 of the blade mounting plate 3 in the direction of the ridge portion 41 and then mount a spare blade into the blade mounting plate 3, release the toggle lever 91 so that it slides back to locked position under the action of the elastic sheet 92, and lock the newly mounted spare blade on the blade mounting plate 3, so that the cutting tool can be used normally, completing the entire blade replacement process.

The beneficial effect of this embodiment is to provide a blade-replaceable cutting tool, which can achieve the quick replacement of the blade and is simple to operate and convenient to use; it requires lower manipulative ability, and an ordinary user can replace the blade, which can effectively extend the overall service life of the cutting tool.

Embodiment 2

Figure 14:
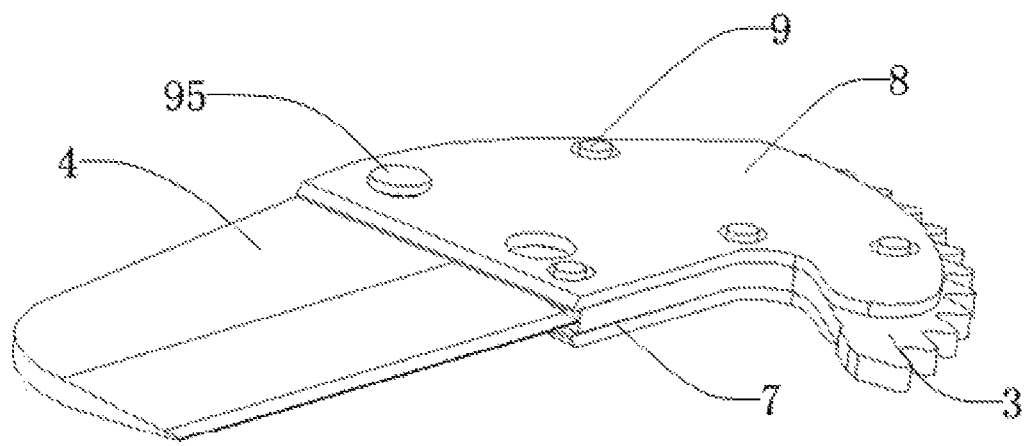
FIG. 14 is a schematic view of the overall structure of the cutting structure according to Embodiment 2 of the present invention.
Figure 15:
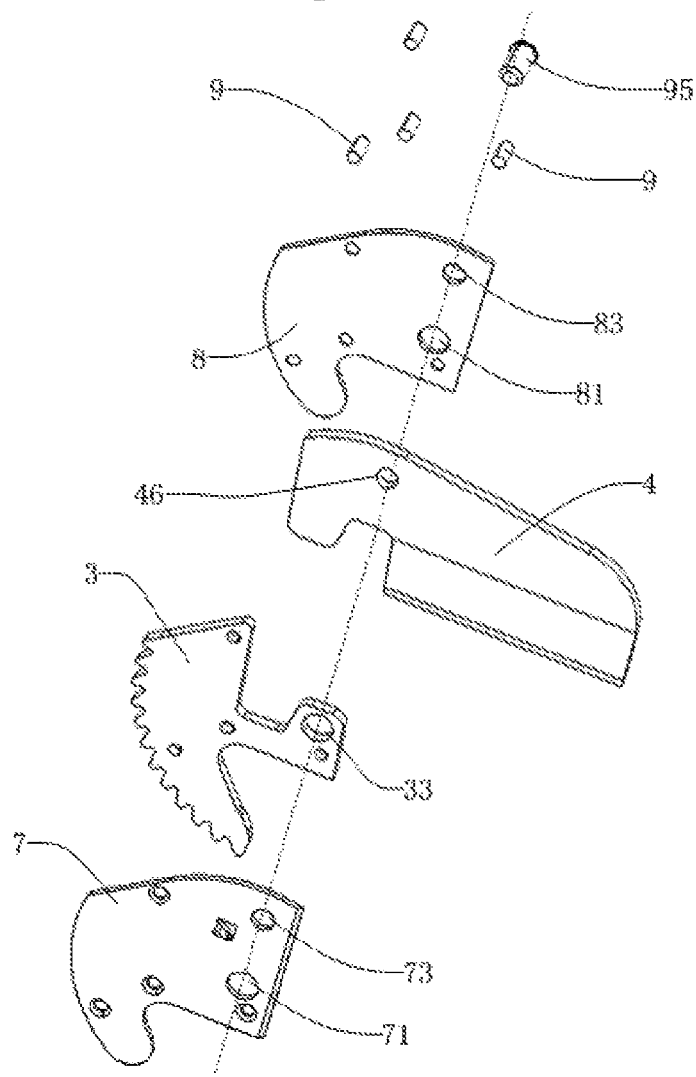
FIG. 15 is an exploded structural schematic view of the cutting structure according to Embodiment 2 of the present invention.

This embodiment provides a blade-replaceable cutting tool, including most of the technical features of Embodiment 1, except that the features of the cutting structure are different, as shown in FIGS. 14 to 15, the cutting structure is collectively constituted by a blade mounting plate 3, a blade 4, a first clamping plate 7, and a second clamping plate 8.

Specifically, the cutting structure according to this embodiment is also a ratchet type component, and the blade mounting plate 3 is rotatably mounted to the first handheld portion 1; the blade 4 is detachably mounted to the blade mounting plate 3.

Figure 16:
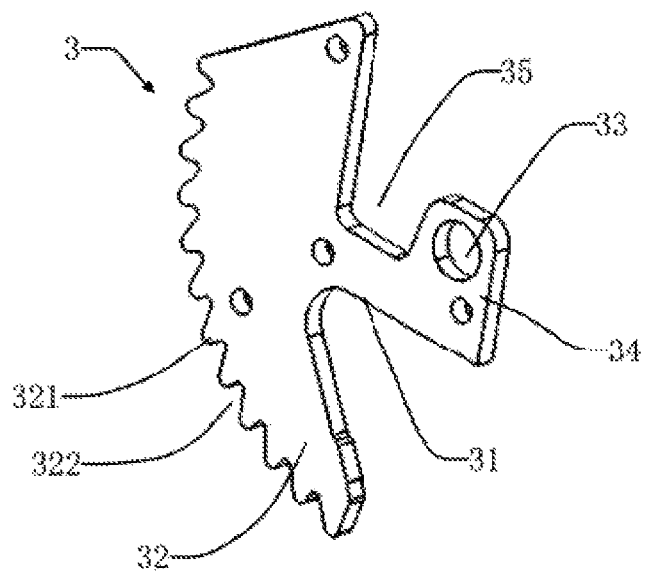
FIG. 16 is a structural schematic view of the blade mounting plate according to Embodiment 2 of the present invention.

As shown in FIG. 16, the blade mounting plate 3 includes a blade mounting plate body 31 having a front end mounted with the blade 4 and a rear end provided with an arcuate plate 32, the arcuate plate 32 is a portion of the ratchet, the arcuate plate 32 includes an arcuate side portion and a non-arcuate side portion, and the side wall thereof includes an arcuate side wall and a non-arcuate side wall; the arcuate side wall of the arcuate plate 32 is provided with a plurality of equally spaced ratchet teeth 321, a ratchet tooth clearance 322 is formed between any two adjacent ratchet teeth 321 so that the first buckle 15 or the second buckle 25 provided within the second handheld portion opening cavity 23 is snapped into any one of the ratchet tooth clearances 322.

The blade mounting plate 3 includes a blade mounting plate through hole 33, and the blade mounting plate 3 can be rotated with the central axis of the blade mounting plate through hole 33 as the axis of rotation.

In this embodiment, the blade mounting plate 3 includes a blade mounting plate latch 34 and a blade mounting plate bayonet 35. The blade mounting plate latch 34 is provided at the front end of the blade mounting plate body 31 and is connected to the non-arcuate side portion at the middle of the arcuate plate 32; and the blade mounting plate bayonet 35 is provided between the blade mounting plate latch 34 and the arcuate plate 32 and has an opening direction facing the blade 4.

Figure 17:
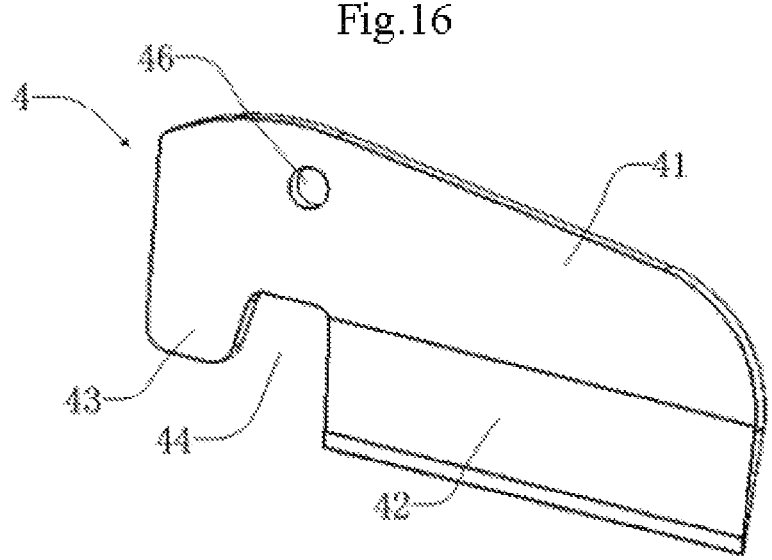
FIG. 17 is a structural schematic view of the blade according to Embodiment 2 of the present invention.

As shown in FIGS. 15 to 17, in this embodiment, the blade 4 includes a ridge portion 41 and a cutting edge portion 42 which are provided integrally, and further includes a blade latch 43 and a blade bayonet 44. The blade latch 43 is provided at the edge of the blade 4 and is provided opposite to the cutting edge portion 42 and is in the same direction as the cutting edge portion 42, and the blade latch 43 is snapped into the blade mounting plate bayonet 35. The blade bayonet 44 is provided between the blade latch 43 and the cutting edge portion 42 and the blade mounting plate latch 34 is snapped into the blade bayonet 44, so that the blade mounting plate 3 is assembled integrally with the blade 4 and remains relatively stable.

This embodiment does not include the toggle lever 91 and the elastic sheet 92, the blade mounting plate 3 also does not include the elastic sheet mounting notch 36, the first clamping plate 7 is not provided with the first kidney-shaped slot 72, and the second clamping plate 8 is also not provided with the second kidney-shaped slot 82.

As shown in FIGS. 15 and 17, this embodiment includes a blade pin mounting hole 46, a first clamping plate pin mounting hole 73, and a second clamping plate pin mounting hole 83. The blade pin mounting hole 46 penetrates through the blade 4 and is located at the portion of the ridge portion 41 close to the blade mounting plate 3.

The first clamping plate pin mounting hole 73 penetrates through the first clamping plate 7 and is provided opposite to the blade pin mounting hole 46; and the second clamping plate pin mounting hole 83 penetrates through the second clamping plate 8 and is provided opposite to the blade pin mounting hole 46.

Figure 18:
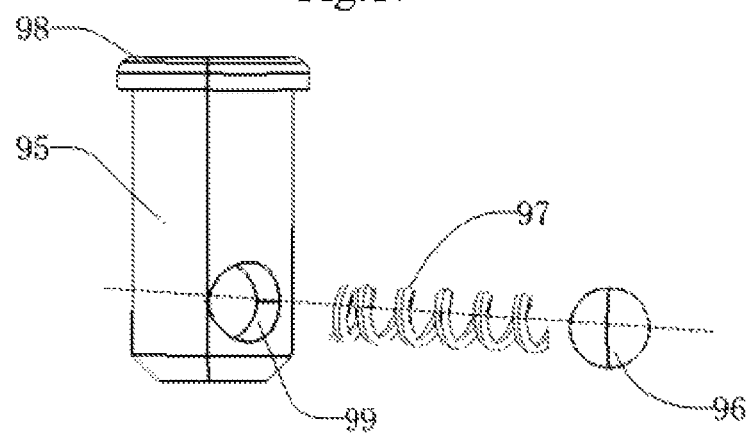
FIG. 18 is a structural schematic view of the pin according to Embodiment 2 of the present invention.

As shown in FIG. 18, this embodiment includes a pin 95, a positioning ball 96, and a positioning spring 97. The pin 95 successively passes through the second clamping plate pin mounting hole 83, the blade pin mounting hole 46, and the second clamping plate pin mounting hole 73, and one end of the pin 95 is provided with a pin cap 98 and the side wall of the other end thereof is provided with a sunken positioning slot 99.

The positioning ball 96 is provided at the opening of the positioning slot 99; one end of the positioning spring 97 is fixedly connected to the bottom of the positioning slot 99 and the other end thereof is fixedly connected to the positioning ball 96. The diameter of the opening of the positioning slot 99 is slightly smaller than the diameter of the positioning ball 96 to prevent the positioning ball 96 from sliding out of the positioning slot 99 entirely.

When the blade 4 is mounted on the blade mounting plate 3, the positioning spring 97 is in a normal shape, the positioning ball 96 protrudes beyond the pin 95, and the pin 95 passes through both the blade 4 and the blade mounting plate 3; since the blade latch 43 is snapped into the blade mounting plate bayonet 35 and the blade mounting plate latch 34 is snapped into the blade bayonet 44, the blade 4 is locked on the blade mounting plate 3 so that the cutting tool according to this embodiment can be used normally, and the specific use method thereof is the same as that of the blade fixed pipe cutter and will not be described here.

When the blade 4 is damaged and the blade 4 needs to be replaced, it is only necessary to press down the positioning ball 96 and then compress the positioning spring 97, and when the positioning ball 96 is fully retracted into the positioning slot 99, the user can pull out the pin 95 and then pull out the blade 4 in the direction of the ridge portion 41, and then mount a spare blade into the blade mounting plate 3, insert the pin 95, and lock the newly mounted spare blade on the blade mounting plate 3, so that the cutting tool can be used normally, completing the entire blade replacement process.

The beneficial effect of this embodiment is to provide a blade-replaceable cutting tool, which can achieve the quick replacement of the blade and is simple to operate and convenient to use; it requires lower manipulative ability, and an ordinary user can replace the blade, which can effectively extend the overall service life of the cutting tool.

Embodiment 3

Figure 19:
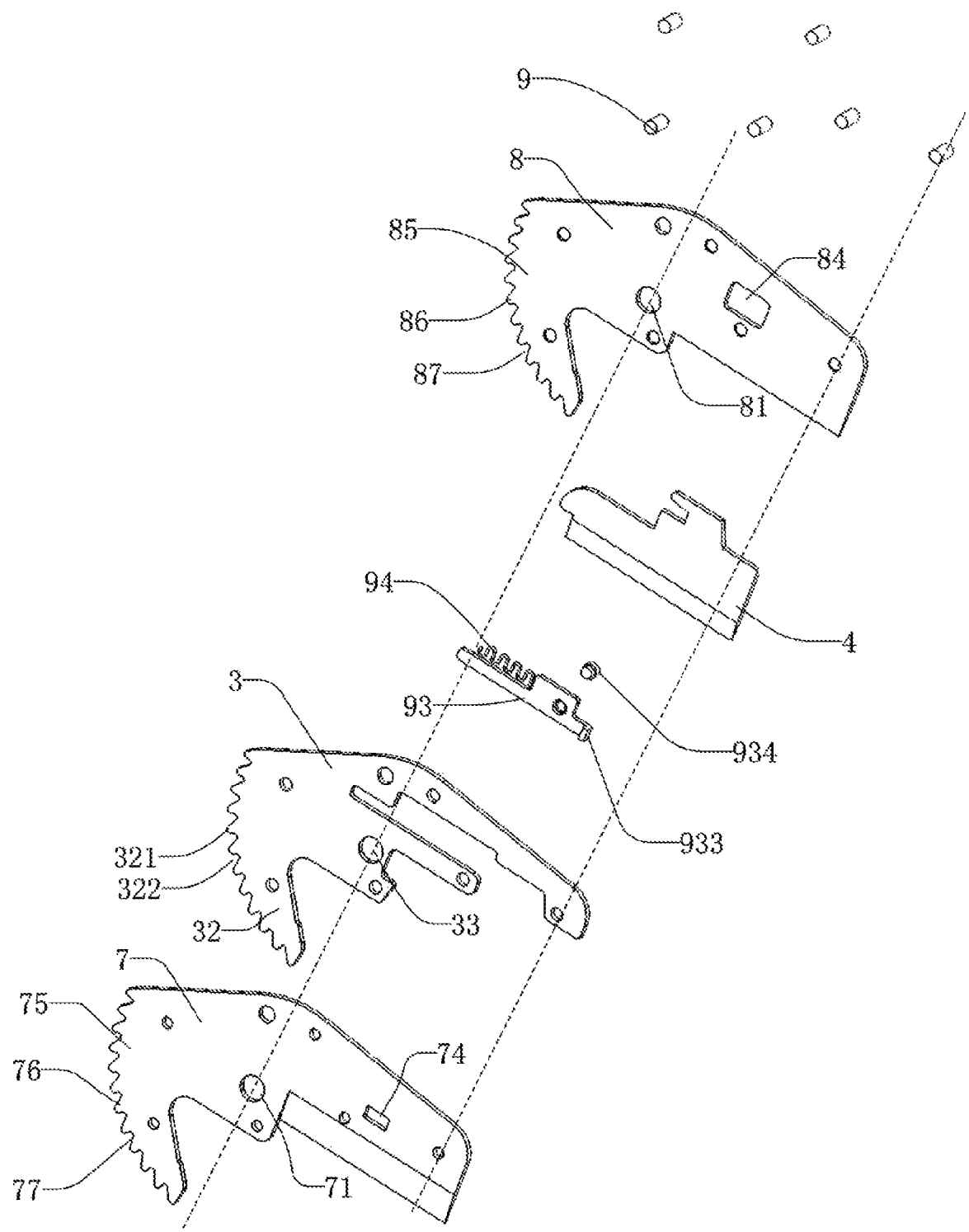
FIG. 19 is an exploded structural schematic view of the cutting structure according to Embodiment 3 of the present invention.
Figure 20:
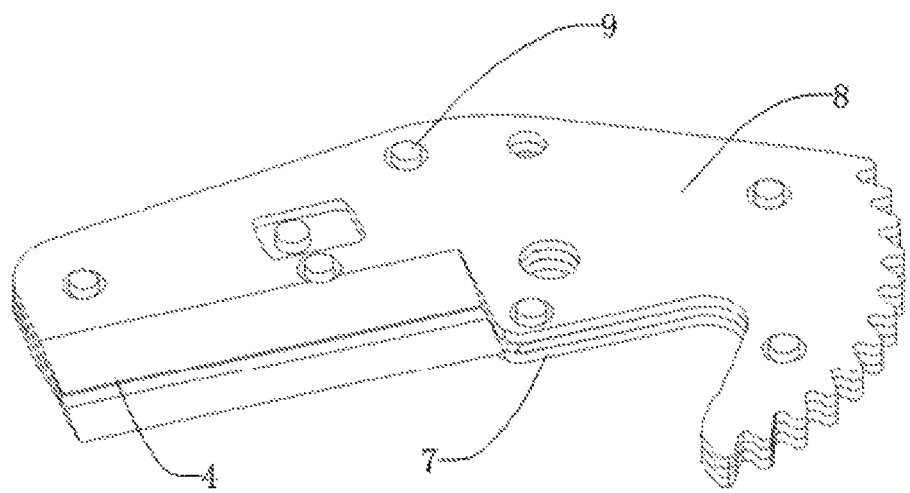
FIG. 20 is a schematic view of the overall structure of the cutting structure according to Embodiment 3 of the present invention.
Figure 21:
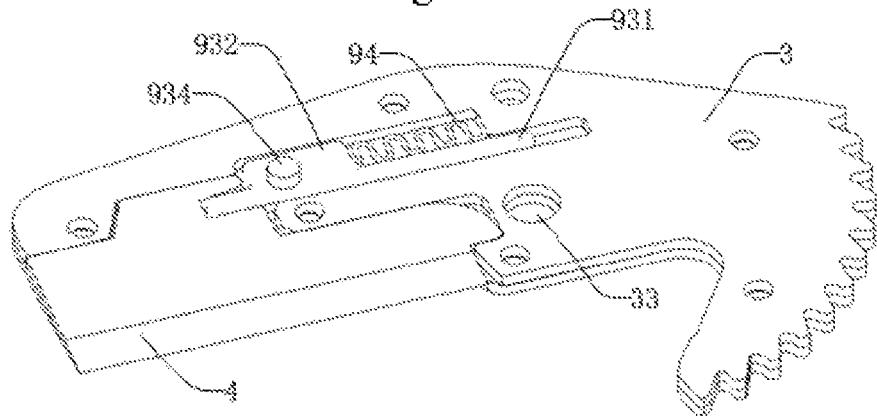
FIG. 21 is a structural schematic view of the cutting structure according to Embodiment 3 of the present invention with the second clamping plate removed.
Figure 22:
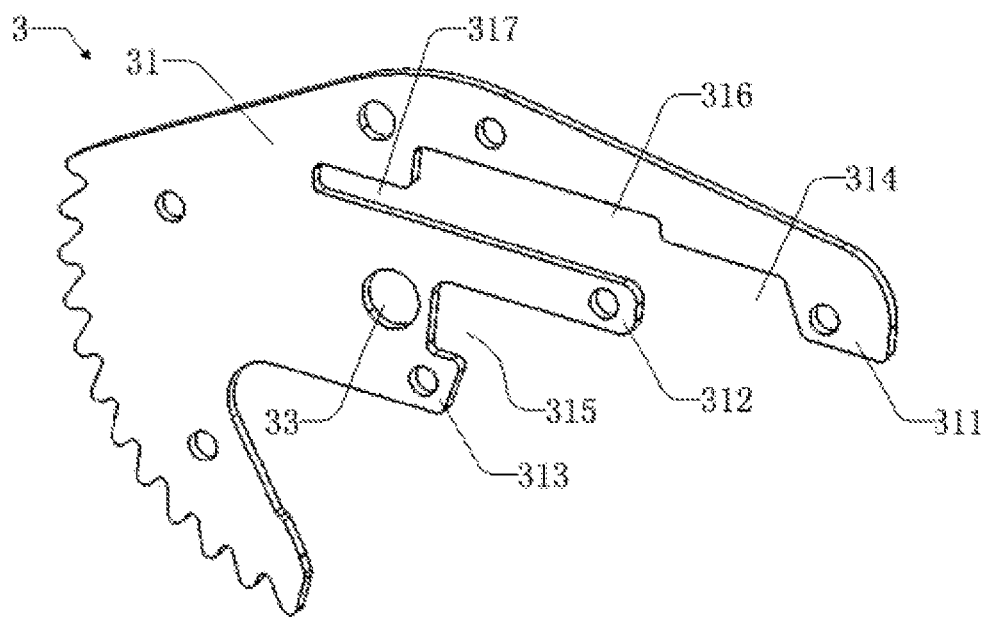
FIG. 22 is a structural schematic view of the blade mounting plate according to Embodiment 3 of the present invention.
Figure 23:
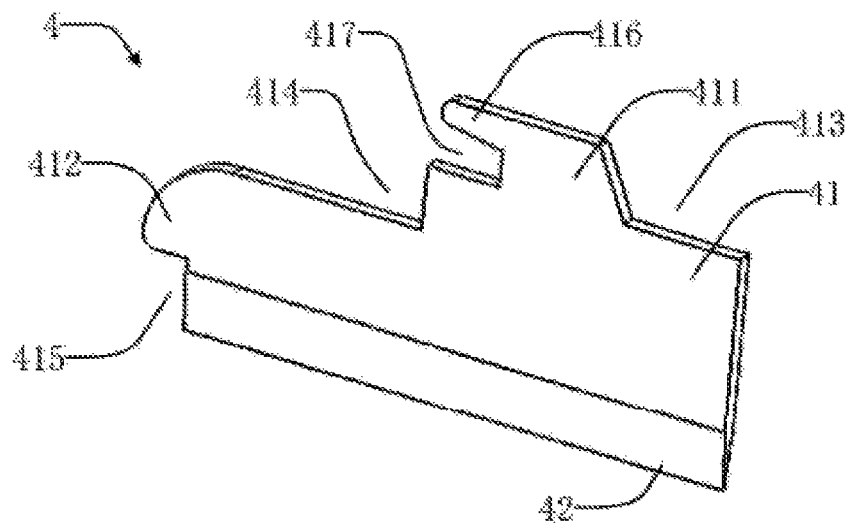
FIG. 23 is a structural schematic view of the blade according to Embodiment 3 of the present invention.

This embodiment provides a blade-replaceable cutting tool, including most of the technical features of Embodiment 1, except that the features of the cutting structure are different, as shown in FIGS. 19 to 20, the cutting structure is collectively constituted by the blade mounting plate 3, the blade 4, the first clamping plate 7, and the second clamping plate 8.

The blade mounting plate 3 is rotatably mounted to the first handheld portion 1; and the blade 4 is detachably mounted to the blade mounting plate 3.

As shown in FIGS. 21 to 24, the blade mounting plate 3 includes a blade mounting plate body 31 having a front end mounted with the blade 4 and a rear end provided with an arcuate plate 32, the arcuate plate 32 is a portion of the ratchet, the arcuate plate 32 includes an arcuate side portion and a non-arcuate side portion, the side wall of the arcuate plate 32 includes an arcuate side wall and a non-arcuate side wall; the arcuate side wall of the arcuate plate 32 is provided with a plurality of equally spaced ratchet teeth 321, a ratchet tooth clearance 321 is formed between any two adjacent ratchet teeth 321 so that the first buckle 15 or the second buckle 25 provided within the second handheld portion opening cavity 23 is snapped into any one of the ratchet tooth clearances 322. The blade mounting plate 3 includes a blade mounting plate through hole 33, and the blade mounting plate 3 can be rotated with the central axis of the blade mounting plate through hole 33 as the axis of rotation.

Both the blade mounting plate 3 and the blade 4 are provided with a plurality of latches and bayonets which cooperate with each other and form snap structures correspondingly, so that the blade mounting plate 3 and the blade 4 are integrally assembled and remain relatively stable.

In this embodiment, the blade mounting plate 3 includes a first latch 311 of the blade mounting plate, a second latch 312 of the blade mounting plate, and a third latch 313 of the blade mounting plate. The first latch 311 of the blade mounting plate is provided at the front end of the blade mounting plate body 31; the second latch 312 of the blade mounting plate is provided at the middle of the blade mounting plate body 31 and corresponds to the ridge portion 41; and the third latch 313 of the blade mounting plate is provided at the middle of the blade mounting plate body 31 and corresponds to the cutting edge portion 42.

The blade mounting plate 3 further includes a first bayonet 314 of the blade mounting plate and a second bayonet 315 of the blade mounting plate; the first bayonet 314 of the blade mounting plate is provided between the first latch 311 of the blade mounting plate and the locking member 93; and the second bayonet 315 of the blade mounting plate is provided between the second latch 312 of the blade mounting plate and the third latch 313 of the blade mounting plate.

The blade 4 includes a ridge portion 41 and a cutting edge portion 42 which are provided integrally, and further includes a first latch 411 of the blade, a second latch 412 of the blade, a first bayonet 413 of the blade, a second bayonet 414 of the blade, and a third bayonet 415 of the blade.

The first latch 411 of the blade is protruding from the top of the ridge portion 41 and is snapped into the first bayonet 314 of the blade mounting plate; and the second latch 412 of the blade is protruding from the rear end of the ridge portion 41 and is snapped into the second bayonet 315 of the blade mounting plate.

The first bayonet 413 of the blade is provided at the front end of the ridge portion 41; the first latch 311 of the blade mounting plate is snapped into the first bayonet 413 of the blade and is tangent to the first latch 411 of the blade. The second bayonet 414 of the blade is provided at the rear end of the ridge portion 41; and the second latch 312 of the blade mounting plate is snapped into the second bayonet 414 of the blade. The third bayonet 415 of the blade is provided at the rear end of the cutting edge portion 42; and the third latch 313 of the blade mounting plate is snapped into the third bayonet 415 of the blade and is tangent to the second latch 414 of the blade.

The blade mounting plate 3 includes an elastic member mounting notch 316 and a locking member mounting notch 317, and the elastic member mounting notch 316 is communicated to the first bayonet 314 of the blade mounting plate for mounting an elastic member; the locking member mounting notch 317 is communicated to the elastic member mounting notch 316 for mounting a locking key.

The blade 4 includes a blade locking latch 416 and a blade locking bayonet 417, the blade locking latch 416 is protruding rearwardly from the first latch 411 of the blade; the blade locking bayonet 417 is enclosed by the blade locking latch 416, the first latch 411 of the blade and the ridge portion 41.

The cutting tool according to this embodiment further includes a locking member 93 and a fourth elastic member 94. The locking member 93 includes a locking lever 931 and a locking block 932 which are provided integrally, the locking lever 931 slides within the locking member mounting notch 316 and has a front end snapped into the blade locking bayonet 417; the locking block 932 is connected to the middle of the locking lever 931 and slides within the elastic member mounting notch 316. The locking member 93 is used to lock the blade 4 on the blade mounting plate 3, and the blade 4 can be removed from the blade mounting plate 3 by a user when the locking member 93 is slid. The fourth elastic member 94 is provided within the elastic member mounting notch 316, and one end of the fourth elastic member 94 is connected to the side wall of the locking block 932 and the other end thereof is connected to the inner side wall of the elastic member mounting notch 316, and the fourth elastic member 94 is preferably a spiral spring. The fourth elastic member 94 enables the locking member 93 to lock the blade in the normal state so that the locking member 93 can slide within the locking member mounting notch 317 under the action of an external force.

Figure 24:
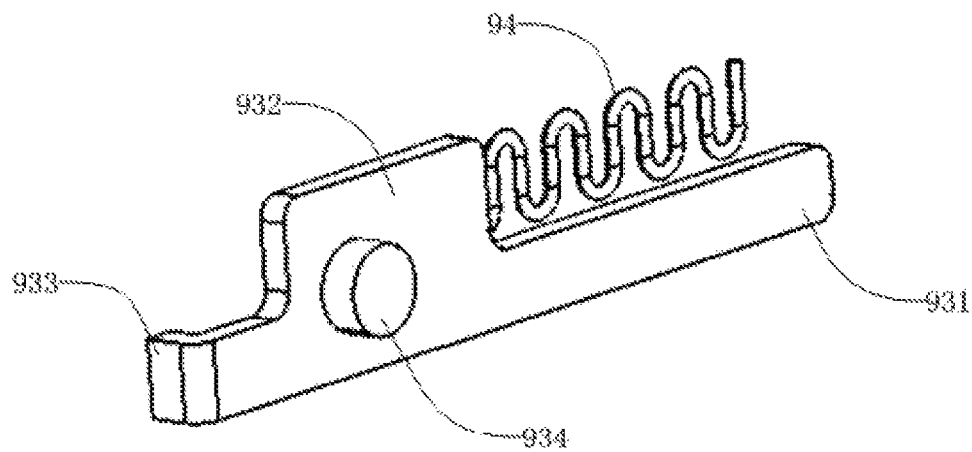
FIG. 24 is a structural schematic view of the elastic member and the locking key according to Embodiment 3 of the present invention.

As shown in FIGS. 19 and 24, the first clamping plate 7 is provided with a first control hole 74 which is provided opposite to the locking block 932; and the side of the locking block 932 facing the first clamping plate 7 is provided with a protruded third toggle member 933; the third toggle member 933 passes through the first control hole 74. The second clamping plate 8 is provided with a second control hole 84 which is provided opposite to the front end of the locking lever 931; and the side of the front end of the locking lever 931 facing the second clamping plate 8 is provided with a protruded fourth toggle member 934; the fourth toggle member 934 passes through the second control hole 84. The third toggle member 933 and the fourth toggle member 934 are respectively provided on both sides of the blade mounting plate 3 and exposed to the outside of the blade mounting plate 3 and the first handheld portion 1, so that the user can toggle the locking member 93 from any direction of the two sides of the blade mounting plate 3, so that the locking member 93 slides within the locking member mounting notch 317.

The first clamping plate 7 includes a first clamping plate arcuate plate 75, first clamping plate ratchet teeth 76, and a first clamping plate ratchet tooth clearance 77. The first clamping plate arcuate plate 75 is provided at the rear end of the first clamping plate 7, and the first clamping plate arcuate plate 75 is a portion of the ratchet; the first clamping plate ratchet teeth 76 are provided on the arcuate side wall of the first clamping plate arcuate plate 75; the first clamping plate ratchet tooth clearance 77 is provided between any two adjacent first clamping plate ratchet teeth 76. The second clamping plate 8 includes a second clamping plate arcuate plate 85, second clamping plate ratchet teeth 86, and a second clamping plate ratchet tooth clearance 87. The second clamping plate arcuate plate 85 is provided at the rear end of the second clamping plate 8 and it is a portion of the ratchet; the second clamping plate ratchet teeth 86 are provided on the arcuate side wall of the second clamping plate arcuate plate 85; the second clamping plate ratchet tooth clearance 87 is provided between any two adjacent second clamping plate ratchet teeth 86. The first clamping plate arcuate plate 75, the second clamping plate arcuate plate 85 and the arcuate plate 32 of the blade mounting plate 3 have the same shape and size, the first clamping plate ratchet tooth clearance 77, the second clamping plate ratchet tooth clearance 87 and the ratchet tooth clearance 322 of the blade mounting plate 3 have the same shape and the corresponding position. The first buckle 15 or the second buckle 25 of the second handheld portion 23 is snapped into any one of the ratchet tooth clearances 322 and is also snapped into the first clamping plate ratchet tooth clearance 77 and the second clamping plate ratchet tooth clearance 87.

During the operation of this embodiment, when the blade 4 is mounted on the blade mounting plate 3, the fourth elastic member 94 is slightly deformed, the front end of the locking lever 931 is inserted into the blade locking bayonet 417, and since the first latch 411 of the blade is snapped into the first bayonet 314 of the blade mounting plate and the second latch of the blade 412 is snapped into the second bayonet 315 of the blade mounting plate, the blade 4 is now locked on the blade mounting plate 3 so that the cutting tool according to this embodiment can be used normally, and the specific use method thereof is the same as that of the blade fixed pipe cutter and will not be described here.

When the blade 4 is damaged and the blade 4 needs to be replaced, the third toggle member 933 or the fourth toggle member 934 is toggled, the fourth elastic member 94 is compressed and then deformed, and the front end of the locking lever 931 is disengaged from the blade locking bayonet 417, whereby the user can pull out the blade 4 of the blade mounting plate 3 in the direction of the cutting edge portion 42 and then mount a spare blade into the blade mounting plate 3, and release the third toggle member 933 or the fourth toggle member 934 so that the front end of the locking lever 931 is inserted into the blade locking bayonet 417 under the action of the fourth elastic member 94, and then lock the newly mounted spare blade on the blade mounting plate 3 so that the cutting tool can be used normally, completing the entire blade replacement process.

The beneficial effect of this embodiment is to provide a blade-replaceable cutting tool, which can achieve the quick replacement of the blade and is simple to operate and convenient to use; it requires lower manipulative ability, and an ordinary user can replace the blade, which can effectively extend the overall service life of the cutting tool.

Embodiment 4

Figure 25:
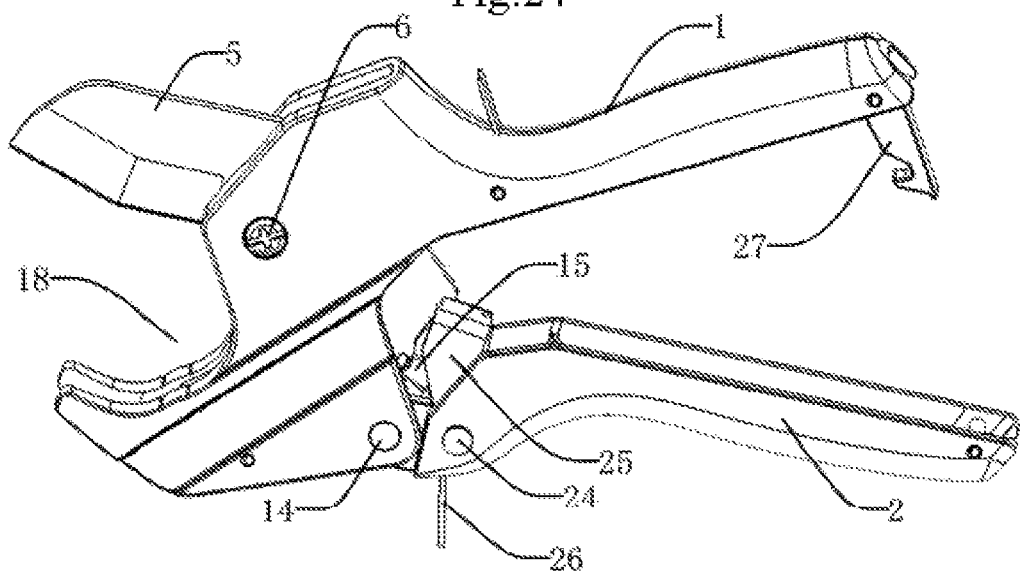
FIG. 25 is a schematic view of the overall structure of Embodiment 4 of the present invention in the open state.
Figure 26:
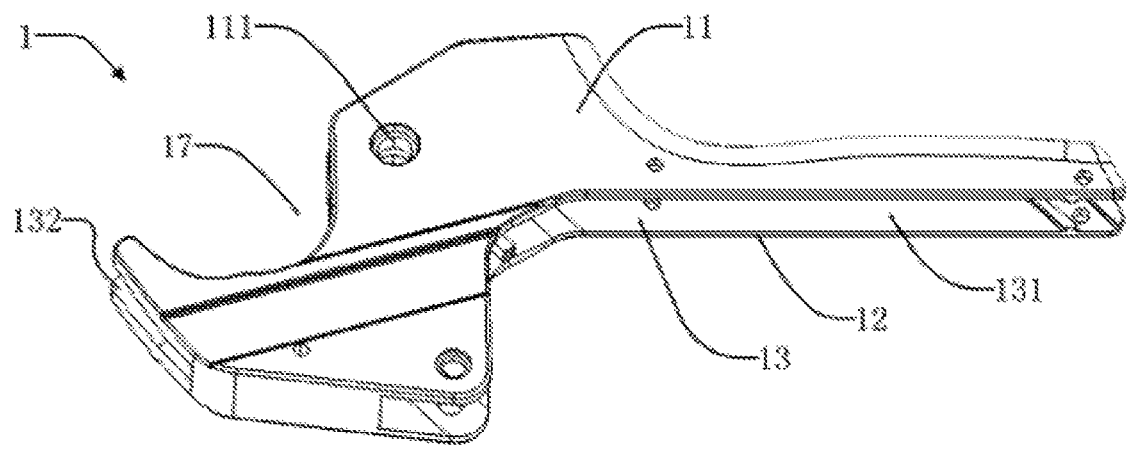
FIG. 26 is a structural schematic view of the first handheld portion according to Embodiment 4 of the present invention.
Figure 27:
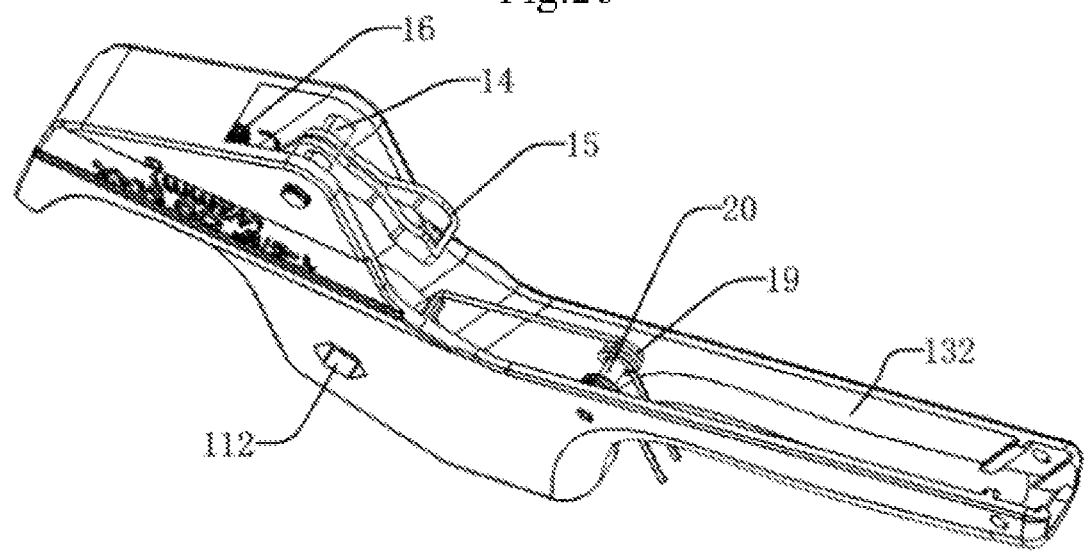
FIG. 27 is a structural schematic view of the first handheld portion and some components inside the first handheld portion according to Embodiment 4 of the present invention.
Figure 28:
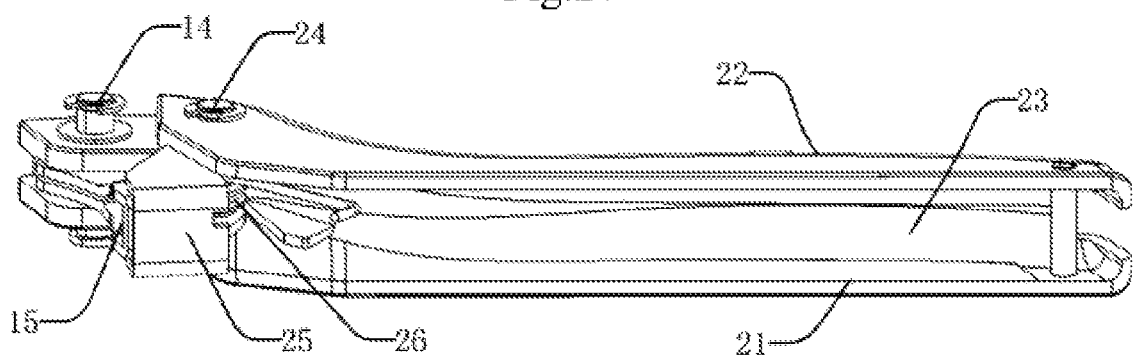
FIG. 28 is a structural schematic view of the second handheld portion according to Embodiment 4 of the present invention.

As shown in FIG. 25, this embodiment provides a blade-replaceable cutting tool, including a first handheld portion 1, a second handheld portion 2, and a ratchet blade 5. The ratchet blade 5 refers to a blade having a portion of the side wall designed to be ratchet-shaped, and the ratchet blade 5 includes an arcuate plate 52, the arcuate plate 52 is a portion of the ratchet and the arcuate side wall thereof is provided with a plurality of uniformly distributed ratchet teeth 521, a ratchet tooth clearance 522 is formed between any two adjacent ratchet teeth 521. In this embodiment, the blade mounting plate 3 and the blade 4 in Embodiments 1, 2 or 3 are replaced with the ratchet blade 5, and the structure of the ratchet blade 5 is similar to the structure formed by the combination of the blade mounting plate 3 and the blade 4.

As shown in FIGS. 26 to 29, the first handheld portion 1 includes a first side wall 11 of the first handheld portion and a second side wall 12 of the first handheld portion which are opposite to each other and provided integrally, and the first side wall 11 of the first handheld portion and the second side wall 12 of the first handheld portion enclose a first handheld portion opening cavity 13, and the first handheld portion opening cavity 13 includes a first opening 131 of the first handheld portion and a second opening 132 of the first handheld portion, and the first opening 131 of the first handheld portion faces the direction of the second handheld portion 2; and the second opening 132 of the first handheld portion faces the outside of the first handheld portion 1; and a portion of the ratchet blade 5 is located within the first handheld portion opening cavity 13.

This embodiment further includes a first pin 14, a first buckle 15 and a first elastic member 16, the first pin 14 is perpendicularly assembled on the inner side of the two side walls 11, 12 of the first handheld portion 1; the first handheld portion 1 and the second handheld portion 2 are rotatably sleeved on the first pin 14. The rear end of the first buckle 15 is rotatably sleeved on the first pin 14 and the front end thereof is snapped into any one of the ratchet tooth clearances. One end of the first elastic member 16 is connected to the first handheld portion 1 and the other end thereof is connected to the first buckle 15, and the first elastic member 16 in this embodiment is preferably an extension spring.

The end of the first handheld portion 1 provided with the ratchet blade 5 further includes a first arcuate groove 17 and a second arcuate groove 18, the first arcuate groove 17 is provided at the edge of the first side wall 11 of the first handheld portion; and the second arcuate groove 18 is provided at the edge of the second side wall 12 of the first handheld portion and is provided opposite to the first arcuate groove 17; the first arcuate groove 17 and the second arcuate groove 18 are provided on both sides of the first handheld portion opening cavity 13, respectively, and two arcuate grooves are used for placing and fixing a pipe to achieve the function of cutting the pipe. The cutting edge of the ratchet blade 5 directly faces the first handheld portion opening cavity 13, and the cutting edge falls into the first handheld portion opening cavity 13 after the cutting process is completed.

The second handheld portion 2 is rotatably connected to the first handheld portion 1 and the second handheld portion 2 includes a first side wall 21 of the second handheld portion and a second side wall 22 of the second handheld portion which are opposite to each other and provided integrally, the first side wall 21 of the second handheld portion and the second side wall 22 of the second handheld portion enclose a second handheld portion opening cavity 23, and the second handheld portion opening cavity 23 has an opening direction facing the first handheld portion 1.

This embodiment further includes a second pin 24, a second buckle 25, and a second elastic member 26, the second pin 24 is perpendicularly assembled to the inner side of the two side walls 21, 22 of the second handheld portion 2. The rear end of the second buckle 25 is rotatably sleeved on the second pin 24 and the front end thereof is snapped into any one of the ratchet tooth clearances; one end of the second elastic member 16 is connected to the second handheld portion 2 and the other end thereof is connected to the second buckle 25. The second elastic member 26 is preferably a torsion spring which is sleeved on the second pin 24, and one end of the torsion spring is connected to the first handheld portion 1 and the other end thereof is detachably connected to the second buckle 25.

In this embodiment, the first buckle 15 or the second buckle 25, under the action of the first elastic member 16 or the second elastic member 26, is snapped into the ratchet tooth clearance in an appropriate place, and during the cutting of the pipe, the two buckles can assist the blade in exerting a force to cut the pipe located between the ratchet blade 5 and the two arcuate grooves 17, 18, thereby achieving a labor-saving effect.

This embodiment further includes a detachable pin 6 provided at the connection between the first handheld portion 1 and the ratchet blade 5, the first handheld portion 1 an the ratchet blade 5 can be rotated about the detachable pin 6 so that the cutting tool according to this embodiment can be used normally, and the specific use method thereof is the same as that of the blade fixed pipe cutter and will not be described here.

The first side wall 11 of the first handheld portion is provided with a first side wall through hole 111 of the first handheld portion; the second side wall 12 of the first handheld portion is provided with a second side wall through hole 121 of the first handheld portion, and the ratchet blade 5 is provided with a blade through hole 54, the detachable pin 6 successively passes through the first side wall through hole 111 of the first handheld portion, the blade through hole 54 and the second side wall through hole 121 of the first handheld portion, the ratchet blade 5 is rotatably connected to the first handheld portion 1 via the detachable pin 6.

Figure 30:
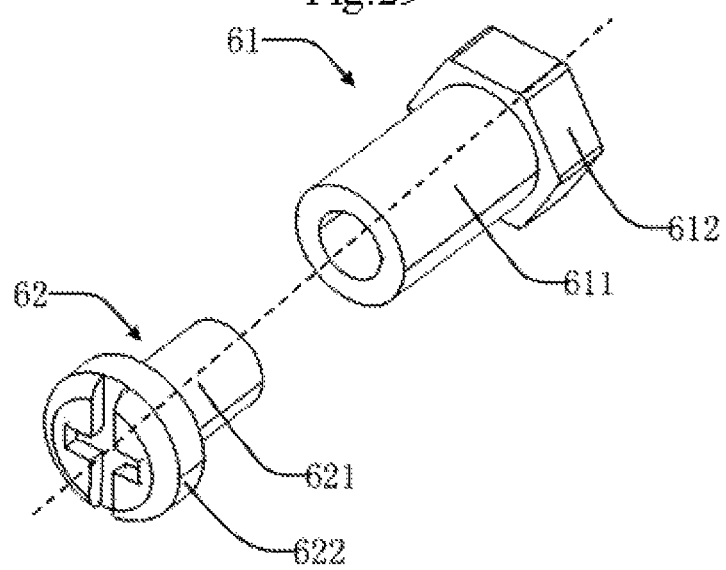
FIG. 30 is a structural schematic view of the detachable pin according to Embodiment 4 of the present invention.

As shown in FIG. 30, the detachable pin 6 includes a hollow shaft 61 and a rotating member 62 which are combined together, the rotating member 62 is detachably assembled to the hollow shaft 61.

The hollow shaft 61 includes a hollow shaft sleeve 611 and a shaft sleeve base 612 which are formed integrally, the hollow shaft sleeve 611 successively passes through the first side wall through hole 111 of the first handheld portion, the blade through hole 54, and the second side wall through hole 121 of the first handheld portion; the shaft sleeve base 612 is exposed to the outside of the first side wall 11 of the first handheld portion.

The rotating member 62 includes a rotating shaft 621 and a rotating shaft base 622 which are formed integrally, the rotating shaft 621 is inserted and threadedly connected to the hollow shaft sleeve 611; the rotating shaft base 622 is exposed to the outside of the second side wall 12 of the first handheld portion, and the outer surface thereof is provided with a flat or cross-shaped groove.

Figure 31:
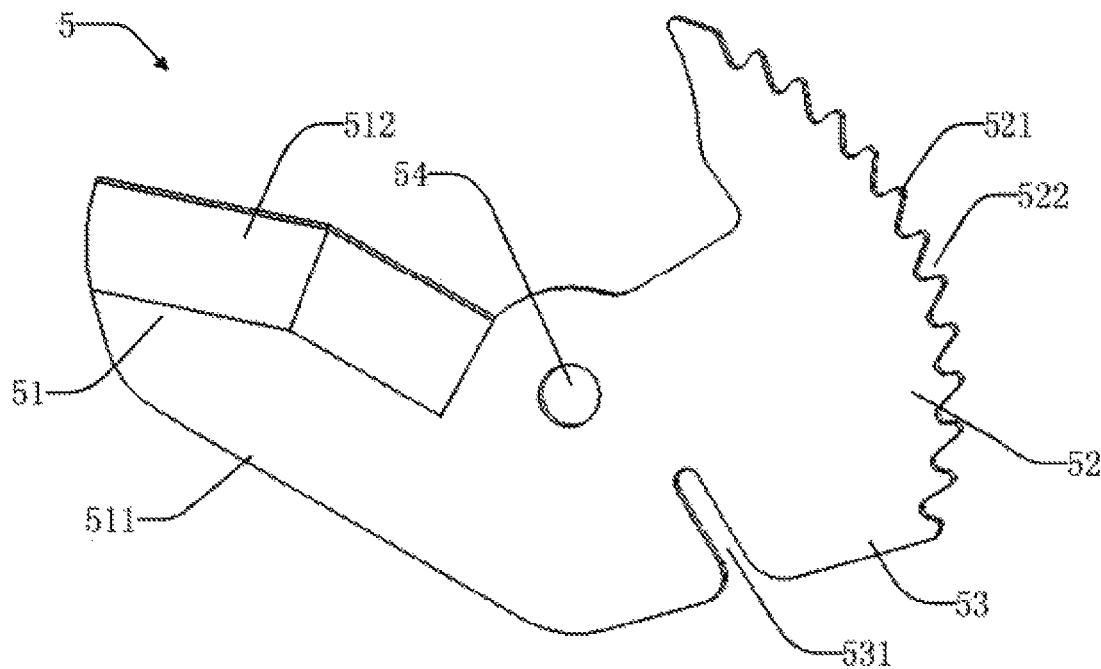
FIG. 31 is a structural schematic view of the ratchet blade according to Embodiment 4 of the present invention.

As shown in FIG. 31, the ratchet blade 5 refers to a blade having a portion of the side wall designed to be ratchet-shaped, including a cutting portion 51, an arcuate plate 52, and a connecting portion 53. This embodiment is opened or closed when in use, the first handheld portion 1 and the second handheld portion 2 are relatively rotated, and the arcuate plate 32 of the ratchet blade 5 cooperates with the first buckle 15 and the second buckle 25 so that the cutting portion 51 can achieve an effective cutting operation, which will not be described here. The cutting portion 51 is provided at the front end of the ratchet blade 5 for cutting an article. The cutting portion 51 includes a ridge portion 511 and a cutting edge portion 512, and the ridge portion 511 faces the outside of the first handheld portion 1; the cutting edge portion 512 faces the second opening 132 of the first handheld portion, and the cutting edge portion 512 is linear or arcuate. When the first handheld portion 1 and the second handheld portion 2 are closed, the cutting edge portion 512 is used to cut a pipe.

The arcuate plate 52 is provided at the rear end of the ratchet blade 5, and the arcuate plate 52 is designed as a portion of the ratchet, which includes ratchet teeth 521 and a ratchet tooth clearance 522, the ratchet teeth 521 are provided on the arcuate side wall of the arcuate plate 52; the ratchet tooth clearance 522 is provided between any two adjacent ratchet teeth 521. A side of the second handheld portion 12 facing the first handheld portion 11 is provided with a first buckle 15 and/or a second buckle 25, which is snapped into any one of the ratchet tooth clearances 522.

The connecting portion 53 is provided between the cutting portion 51 and the arcuate plate 52 and is rotatably connected to the first handheld portion 11. The connecting portion 53 includes a connecting portion snap slot 531 which is sunken to the side wall of the connecting portion 53 and is snapped by one end of the third elastic member 19.

Figure 29:
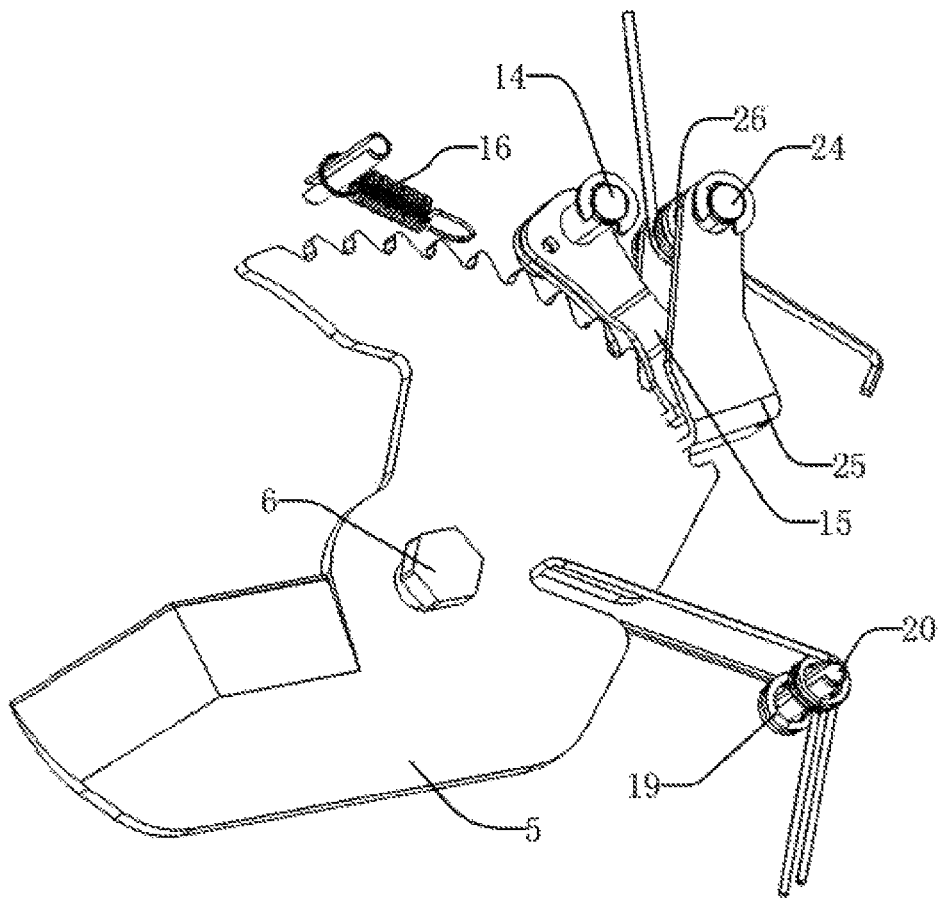
FIG. 29 is a structural schematic view of the components inside the first and second handheld portions according to Embodiment 4 of the present invention.

As shown in FIG. 29, this embodiment further includes a third elastic member 19 having one end connected to the first handheld portion 1 and the other end connected to the ratchet blade 5; the third elastic member 19 is preferably a torsion spring such as a double torsion spring which is sleeved on a torsion spring mounting shaft 20, and both ends of the torsion spring mounting shaft 20 are perpendicularly fixed to the inner side of the two side walls 11, 12 of the first handheld portion 1. One end of the third elastic member 19 is fixed to the first handheld portion 1 and the other end thereof is connected to the ratchet blade 5, and in this embodiment, is snapped into the connecting portion snap slot 531 of the ratchet blade 5.

In this embodiment, during the opening or closing of the first handheld portion 1 and the second handheld portion 2, the third elastic member 19 assists in exerting a force or limits the range of rotation of the blade, which can ensure that the opening angle is within an appropriate range to prevent the components from being damaged and to reduce the security risk during use.

As shown in FIG. 25, the distal end of the second handheld portion 2 is provided with a handheld portion fixing device 27 having one end hinged to the distal end of the second handheld portion 2 and the other end detachably mounted to the distal end of the first handheld portion 1 for closing the first handheld portion 1 and the second handheld portion 2.

When the ratchet blade 5 is damaged and the ratchet blade 5 needs to be replaced, the user can remove the rotating member 62 from the hollow shaft 61 by means of a handheld tool such as a screwdriver, so that the detachable pin 6 can be removed from the first handheld portion 1, and then the ratchet blade 5 can be separated from the first handheld portion 1 so that the user can replace it by themselves with a spare blade which has exactly the same shape and size as the original ratchet blade 5. During the mounting of the spare blade, the spare blade is placed within the first handheld portion 1 so that the blade through hole 54 of the spare blade is on the same straight line as the first side wall through hole 111 of the first handheld portion and the second side wall through hole 121 of the first handheld portion. Thereafter, the user passes the hollow shaft 61 successively through the first side wall through hole 111 of the first handheld portion, the blade through hole 54, and the second side wall through hole 121 of the first handheld portion, and then connects it to the rotating member 62. The user can mount the rotating member 62 to the hollow shaft 61 by means of a handheld tool such as a screwdriver so that the two are relatively fixed.

The beneficial effect of this embodiment is to provide a blade-replaceable cutting tool, the ratchet blade is assembled to the first handheld portion by means of a detachable pin, so that the ratchet blade can be easily and quickly separated from the first handheld portion, thereby achieving the replacement of the ratchet blade. This embodiment is simple to operate and convenient to use and requires lower manipulative ability of the user, and an ordinary user can replace the blade, which can effectively extend the overall service life of the cutting tool.

Embodiment 5

Figure 32:
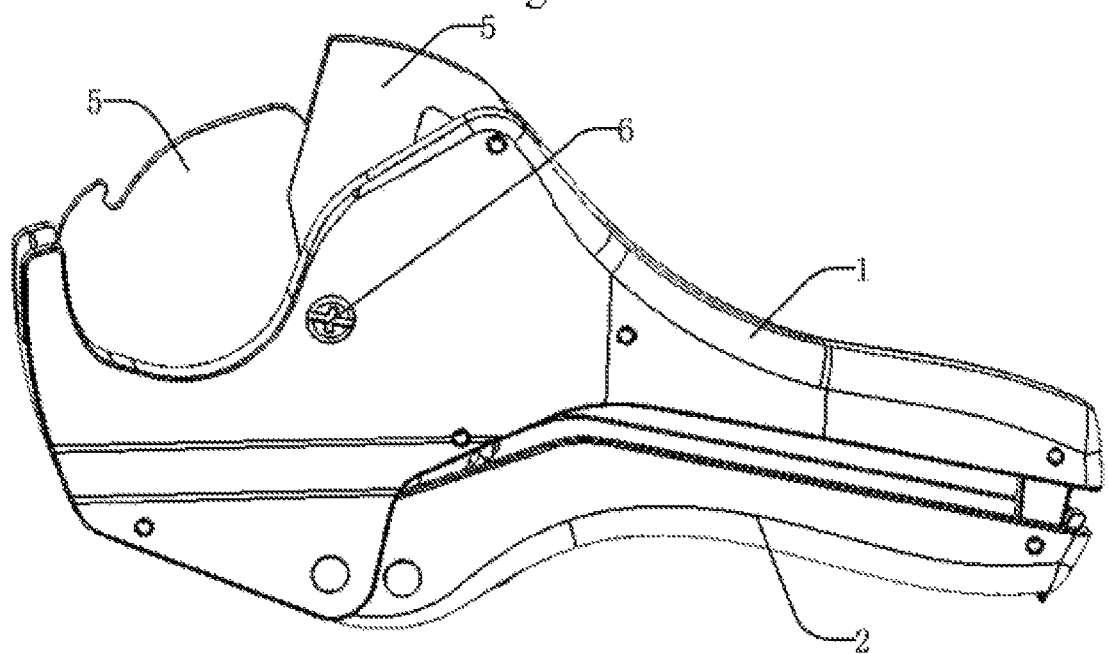
FIG. 32 is a schematic view of the overall structure of Embodiment 5 of the present invention.

This embodiment provides a blade-replaceable cutting tool, as shown in FIG. 32, including a first handheld portion 1, a second handheld portion 2, and more than two ratchet blades 5 which are rotatably mounted to the first handheld portion 11 by means of the detachable pin 6.

Embodiment 5 includes most of the technical features of Embodiment 4, and the distinguishing technical feature between them is that, as shown in FIGS. 32 to 36, in Embodiment 5, the detachable pin 6 includes a nut 63 and a screw 64, the nut 63 is exposed to the outside of the first side wall 11 of the first handheld portion; the screw 64 successively passes through the first side wall through hole 111 of the first handheld portion, the blade through hole 54, and the second side wall through hole 112 of the first handheld portion, and the front end thereof is inserted and threadedly connected to the nut 63 and the rear end thereof is provided with a screw base 65; the screw base 65 is exposed to the outside of the second side wall 12 of the first handheld portion, and the outer surface thereof is provided with a flat or cross-shaped groove.

The ratchet blade 5 refers to a blade having a portion of the side wall designed to be ratchet-shaped, including a cutting portion 51, an arcuate plate 52, and a connecting portion 53. Another distinguishing feature between Embodiment 5 and Embodiment 4 is that the arcuate plate 52 includes an arcuate plate snap hole 523 penetrating through one end of the arcuate plate 52 and snapped by one end of the third elastic member 19.

Figure 33:
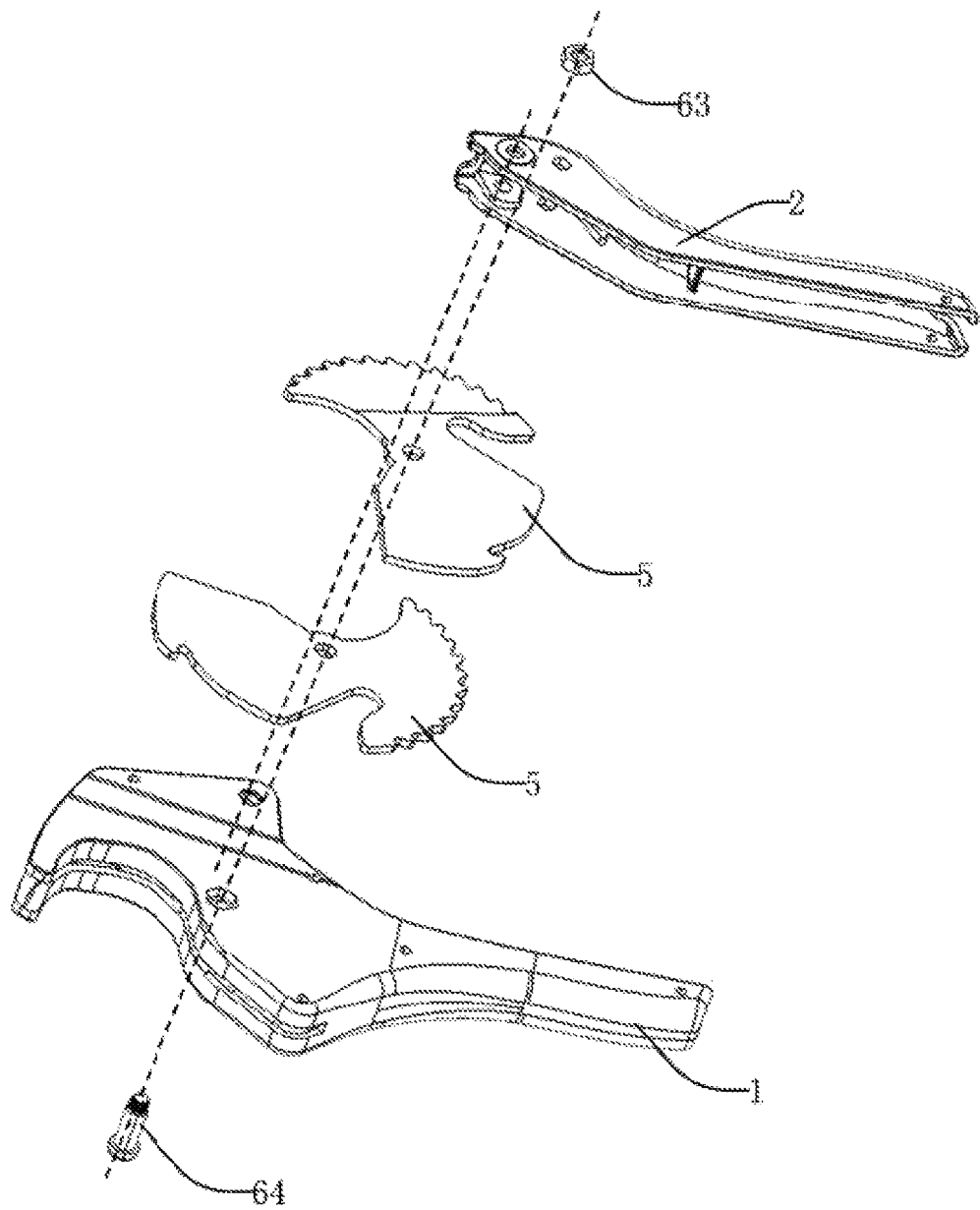
FIG. 33 is an exploded structural schematic view of a part of the structure of Embodiment 5 of the present invention.
Figure 34:
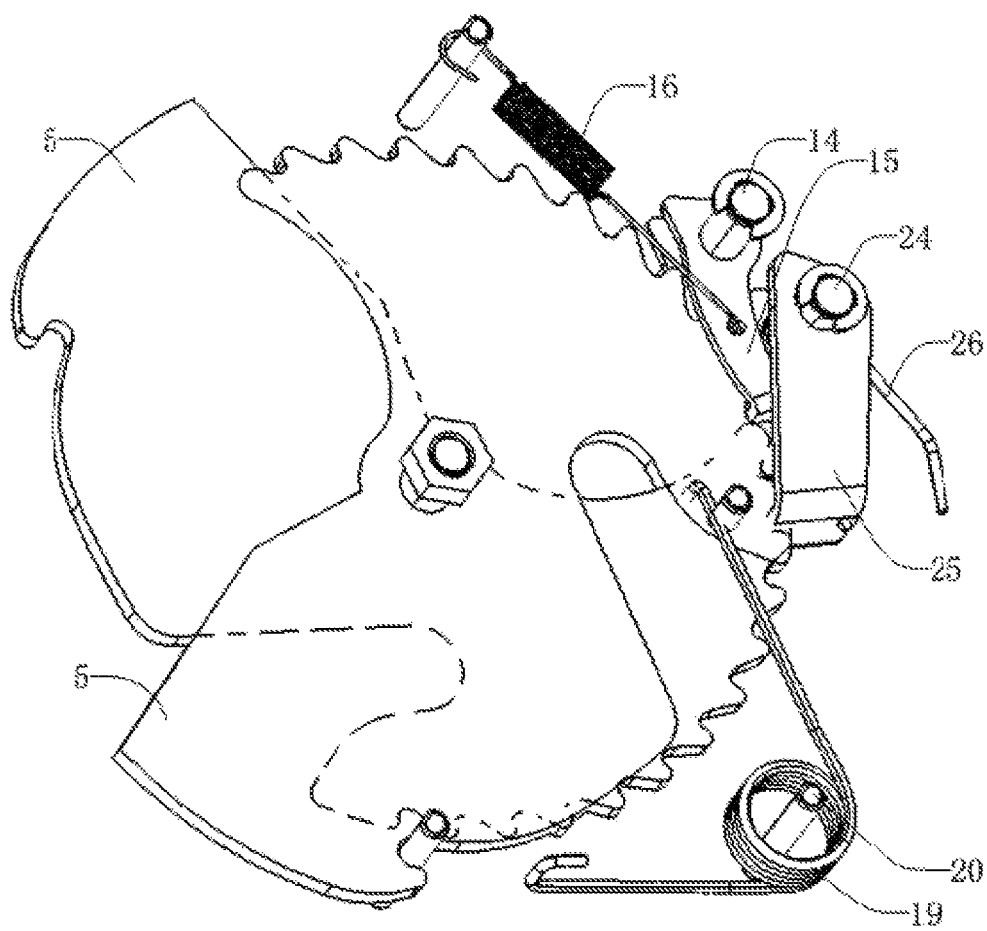
FIG. 34 is a structural schematic view of the components inside the first and second handheld portions according to Embodiment 5 of the present invention.
Figure 35:
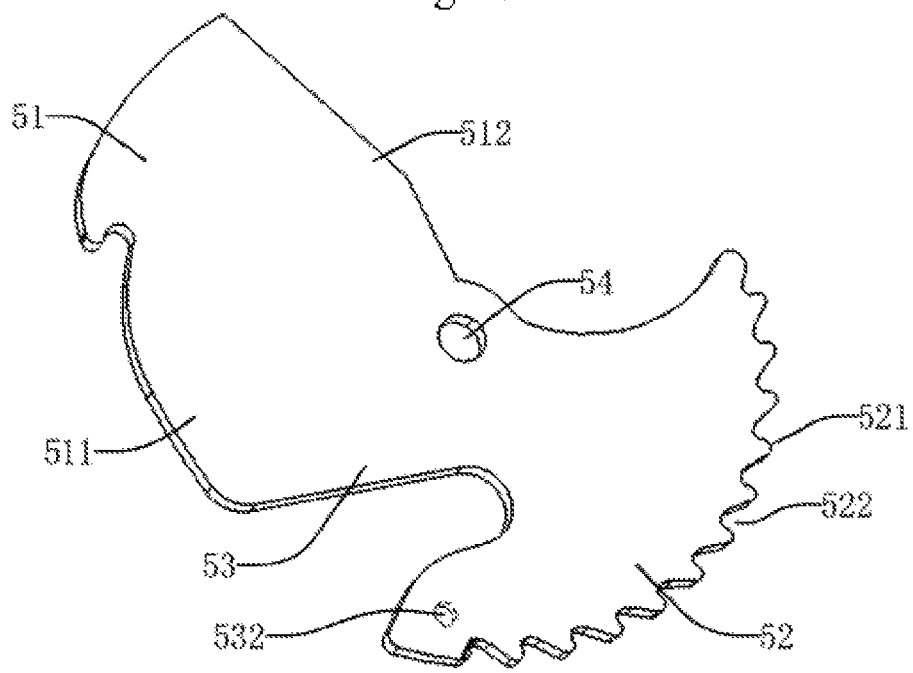
FIG. 35 is a structural schematic view of the ratchet blade according to Embodiment 5 of the present invention.
Figure 36:
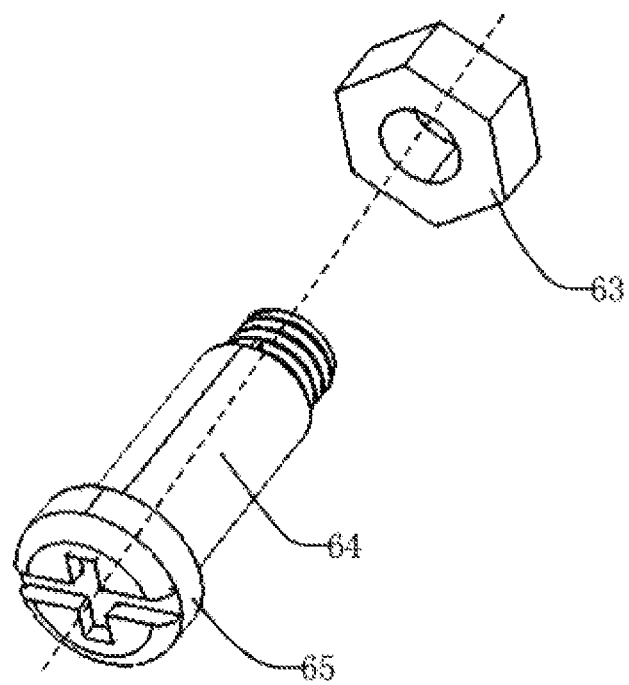
FIG. 36 is a structural schematic view of the detachable pin according to Embodiment 5 of the present invention.

As shown in FIG. 33, this embodiment includes two ratchet blades 5 which have the same shape and are adjacent to each other, both of which are sleeved on the detachable pin 6, and the two remain relatively deflected and have a deflection angle of 90 to 150 degrees, preferably 120 degrees. The arcuate plate snap hole 523 of one ratchet blade 5 is provided at the left end of the arcuate plate 52 and the arcuate plate snap hole 523 of the other ratchet blade 5 is provided at the right end of the arcuate plate 52, and one end of the third elastic member 19 passes through both of the two arcuate plate snap holes 523 so that the two ratchet blades 5 are relatively fixed.

In this embodiment, the third elastic member 19 is preferably a torsion spring which is sleeved on a torsion spring mounting shaft 20, one end of the torsion spring is connected to the first handheld portion 1 and the other end thereof is simultaneously snapped into the two arcuate plate snap holes 532 of the two ratchet blades 5. In this embodiment, during the opening and closing of the first handheld portion 1 and the second handheld portion 2, the third elastic member 19 assists in exerting a force or limits the range of rotation of the ratchet blade 5, which can prevent the components from being damaged and reduce the security risk during use.

The other technical solutions and technical effects of this embodiment are the same as or similar to those of Embodiment 4 and will not be described here.

When any one of the ratchet blades 5 is damaged and the ratchet blade 5 needs to be replaced, the user can remove the screw 64 from the nut 63 by means of a handheld tool such as a screwdriver so that the detachable pin 6 can be removed from the first handheld portion 1, and then the two ratchet blades 5 can be separated from the first handheld portion 1 so that the user can replace it by themselves with a spare blade which has exactly the same shape and size as the original ratchet blade 5. The spare blade is placed within the first handheld portion 1 so that the blade through holes 54 of the two ratchet blades 5 are on the same straight line as the first side wall through hole 111 of the first handheld portion and the second side wall through hole 121 of the first handheld portion, and then the user passes the screw 64 successively through the first side wall through hole 111 of the first handheld portion, the blade through hole 54, and the second side wall through hole 121 of the first handheld portion, and then threadedly connects it to the nut 63. The user can mount the screw 64 to the nut 63 by means of a handheld tool such as a screwdriver so that the two are relatively fixed.

The beneficial effect of this embodiment is to provide a blade-replaceable cutting tool, a plurality of ratchet blades are assembled to the first handheld portion by means of a detachable pin, so that the ratchet blades can be easily and quickly separated from the first handheld portion, thereby achieving the replacement of the ratchet blades. This embodiment is simple to operate and convenient to use and requires lower manipulative ability of the user, and an ordinary user can replace the blade, which can effectively extend the overall service life of the cutting tool.

The preferred specific embodiments of the present invention have been described in detail above. It is to be understood that numerous modifications and variations can be made by those ordinary skilled in the art in accordance with the concepts of the present invention without any inventive effort. Hence, the technical solutions that can be derived by those skilled in the art according to the concepts of the present invention on the basis of the prior art through logical analysis, reasoning and limited experiments should be within the scope of protection defined by the claims.

The invention claimed is:

1. A blade-replaceable cutting tool, comprising:
   a first handheld portion;
   a second handheld portion rotatably connected to the first handheld portion;
   a cutting structure rotatably connected to the first handheld portion;
   wherein the cutting structure comprises a ratchet blade configured to be detachable from the first handheld portion, the ratchet blade refers to a blade having a portion of a side wall designed to be ratchet-shaped, and the ratchet blade comprises:
   a cutting portion provided at a front end of the ratchet blade;
   an arcuate plate arranged at a rear end of the ratchet blade, the arcuate plate has an arcuate side wall with ratchet teeth provided thereon;
   a connecting portion provided between the cutting portion and the arcuate plate and comprising a connecting portion snap slot extending from an outer edge of the connecting portion toward a detachable pin, wherein the connecting portion snap slot has an opening at the outer edge of the connecting portion;
   wherein the cutting structure further comprises a torsion spring sleeved on a mounting shaft, the mounting shaft is perpendicularly fixed to side walls of the first handheld portion, the connecting portion snap slot extends from the outer edge at a depth sufficient to accommodate an arm of the torsion spring, one arm of the torsion spring extends through the opening into the connecting portion snap slot, another arm of the torsion spring is fixed to the first handheld portion, the torsion spring is configured that during a process of opening or closing the first handheld portion and the second handheld portion, the torsion spring assists in exerting a force on the ratchet blade and the first handheld portion;
   wherein the detachable pin is provided at a connection between the first handheld portion and the ratchet blade, and the first handheld portion and the ratchet blade can be rotated about the detachable pin.

2. The blade-replaceable cutting tool according to claim 1, wherein the arcuate plate further comprises:
   a ratchet tooth clearance provided between any two adjacent ratchet teeth;
   wherein the second handheld portion is provided with a first buckle and/or a second buckle on a side facing the first handheld portion, which is snapped into any one of the ratchet tooth clearances.

3. The blade-replaceable cutting tool according to claim 1, wherein
   a first side wall through hole of the first handheld portion penetrating through a first side wall of the first handheld portion;
   a second side wall through hole of the first handheld portion penetrating through a second side wall of the first handheld portion; and
   a blade through hole penetrating through the ratchet blade;
   wherein the detachable pin successively passes through the first side wall through hole of the first handheld portion, the blade through hole and the second side wall through hole of the first handheld portion.

4. The blade-replaceable cutting tool according to claim 3, wherein the detachable pin comprises:
   a hollow shaft comprising the following components which are formed integrally:
   a hollow shaft sleeve successively passing through the first side wall through hole of the first handheld portion, the blade through hole and the second side wall through hole of the first handheld portion; and
   a shaft sleeve base exposed to the outside of the first side wall of the first handheld portion; and
   a rotating member comprising the following components which are formed integrally:
   a rotating shaft inserted and threadedly connected to the hollow shaft sleeve; and
   a rotating shaft base exposed to the outside of the second side wall of the first handheld portion and having an outer surface provided with a flat or cross-shaped groove.

5. The blade-replaceable cutting tool according to claim 3, wherein the detachable pin comprises:
   a nut exposed to the outside of the first side wall of the first handheld portion; and
   a screw having a front end inserted and threadedly connected to the nut and a rear end provided with a screw base exposed to the outside of the second side wall of the first handheld portion and having an outer surface provided with a flat or cross-shaped groove.

\* \* \* \* \*